US012755353B2

(12) United States Patent
Kim et al.

(10) Patent No.: US 12,755,353 B2
(45) Date of Patent: Oct. 6, 2026

(54) ARTIFICIAL INTELLIGENCE DEEP LEARNING FOR CONTROLLING ALIASING ARTIFACTS

(71) Applicant: Samsung Electronics Co., Ltd., Suwon-si (KR)

(72) Inventors: Joonsoo Kim, Irvine, CA (US); Tien C. Bau, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 18/527,955

(22) Filed: Dec. 4, 2023

(65) Prior Publication Data

US 2025/0029217 A1 Jan. 23, 2025

Related U.S. Application Data

(60) Provisional application No. 63/527,921, filed on Jul. 20, 2023.

(51) Int. Cl.
*G06T 5/73* (2024.01)

(52) U.S. Cl.
CPC ...... *G06T 5/73* (2024.01); *G06T 2207/20081* (2013.01); *G06T 2207/20084* (2013.01); *G06T 2207/20221* (2013.01)

(58) Field of Classification Search
USPC .......................................................... 382/254
See application file for complete search history.

(56) References Cited

U.S. PATENT DOCUMENTS

2020/0364845 A1 11/2020 Edis
2022/0114702 A1 4/2022 Liu et al.
2022/0138500 A1 5/2022 Levinshtein et al.
2023/0053776 A1 2/2023 Wong et al.
2023/0153958 A1 * 5/2023 Lung ....................... G06T 7/254 382/100

FOREIGN PATENT DOCUMENTS

EP 1471728 A1 * 10/2004 ............... G06T 5/10

* cited by examiner

*Primary Examiner* — Jacky X Zheng

(57) ABSTRACT

A method includes receiving a degraded image including aliasing artifacts and inputting the degraded image to an image enhancement network. This method also includes processing, using the image enhancement network, the degraded image to remove one or more of the aliasing artifacts and outputting, by the image enhancement network, a restored high-quality image. Another method includes obtaining a high-quality image of an environment and generating at least one degraded image of the environment by performing an aliasing artifact simulation on the obtained high-quality image. Performing the aliasing artifact simulation includes (i) performing a broken line artifact simulation to introduce one or more broken line artifacts on one or more objects in the environment of the high-quality image and/or (ii) performing a jaggy artifact simulation to introduce jaggy edges to one or more other objects in the environment of the high-quality image.

20 Claims, 18 Drawing Sheets

401

402

403

501

502

503

801

802

805

804

803

901

902

903

1103

1102

1101

1203

1202

1201

1301

1302

1401

1402

ARTIFICIAL INTELLIGENCE DEEP LEARNING FOR CONTROLLING ALIASING ARTIFACTS

CROSS-REFERENCE TO RELATED APPLICATION AND PRIORITY CLAIM

This application claims priority under 35 U.S.C. § 119(e) to U.S. Provisional Patent Application No. 63/527,921 filed on Jul. 20, 2023. This provisional application is hereby incorporated by reference in its entirety.

TECHNICAL FIELD

This disclosure relates generally to image processing and machine learning systems. More specifically, this disclosure relates to artificial intelligence deep learning for controlling aliasing artifacts.

BACKGROUND

Depending on three-dimensional (3D) video rendering quality, rendered video such as video game video can include many artifacts. In particular, aliasing artifacts such as jaggy, broken line, or dashed line artifacts are frequent and can cause significant image quality degradation. However, collecting one or more pairs of a degraded image and a high-quality image for training a neural network or other machine learning model is very difficult if a 3D model of the entire game with a rendering system is not available and only rendered 2D images are available. This tends to be the case where a 3D model is only available to the content and/or game provider and the rendering quality control system is not available to client devices.

SUMMARY

This disclosure relates to artificial intelligence deep learning for controlling aliasing artifacts.

In a first embodiment, a method includes receiving a degraded image including aliasing artifacts. The method also includes inputting the degraded image to an image enhancement network. The method further includes processing, using the image enhancement network, the degraded image to remove one or more of the aliasing artifacts. In addition, the method includes outputting, by the image enhancement network, a restored high-quality image.

In a second embodiment, an electronic device includes at least one processing device configured to receive a degraded image including aliasing artifacts. The at least one processing device is also configured to input the degraded image to an image enhancement network. The at least one processing device is further configured to process, using the image enhancement network, the degraded image to remove one or more of the aliasing artifacts. In addition, the at least one processing device is configured to output, by the image enhancement network, a restored high-quality image.

In a third embodiment, a non-transitory machine-readable medium contains instructions that when executed cause at least one processor of an electronic device to receive a degraded image including aliasing artifacts. The non-transitory machine-readable medium also contains instructions that when executed cause the at least one processor to input the degraded image to an image enhancement network. The non-transitory machine-readable medium further contains instructions that when executed cause the at least one processor to process, using the image enhancement network, the degraded image to remove one or more of the aliasing artifacts. In addition, the non-transitory machine-readable medium contains instructions that when executed cause the at least one processor to output, by the image enhancement network, a restored high-quality image.

In a fourth embodiment, a method includes obtaining a high-quality image of an environment. The method also includes generating at least one degraded image of the environment by performing an aliasing artifact simulation on the obtained high-quality image. Performing the aliasing artifact simulation includes at least one of performing a broken line artifact simulation to introduce one or more broken line artifacts on one or more objects in the environment of the high-quality image and performing a jaggy artifact simulation to introduce jaggy edges to one or more other objects in the environment of the high-quality image.

In a fifth embodiment, an electronic device includes at least one processing device configured to obtain a high-quality image of an environment. The at least one processing device is also configured to perform an aliasing artifact simulation on the obtained high-quality image in order to generate at least one degraded image of the environment. To perform the aliasing artifact simulation, the at least one processing device is configured to at least one of perform a broken line artifact simulation to introduce one or more broken line artifacts on one or more objects in the environment of the high-quality image and perform a jaggy artifact simulation to introduce jaggy edges to one or more other objects in the environment of the high-quality image.

In a sixth embodiment, a non-transitory machine-readable medium contains instructions that when executed cause at least one processor of an electronic device to obtain a high-quality image of an environment. The non-transitory machine-readable medium also contains instructions that when executed cause the at least one processor to perform an aliasing artifact simulation on the obtained high-quality image in order to generate at least one degraded image of the environment. The instructions that when executed cause the at least one processor to perform the aliasing artifact simulation comprise instructions that when executed cause the at least one processor to at least one of perform a broken line artifact simulation to introduce one or more broken line artifacts on one or more objects in the environment of the high-quality image and perform a jaggy artifact simulation to introduce jaggy edges to one or more other objects in the environment of the high-quality image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
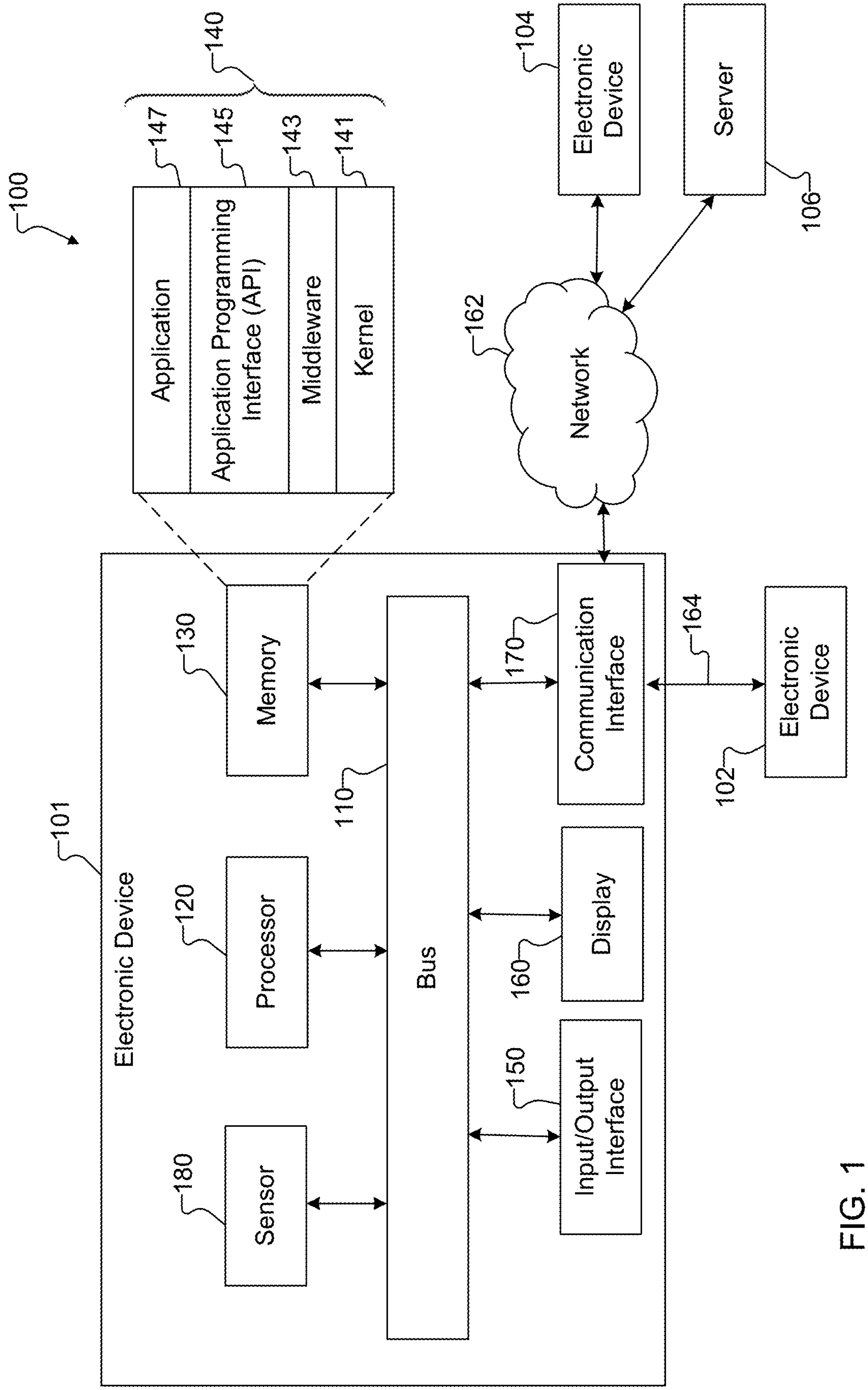
FIG. 1 illustrates an example network configuration including an electronic device in accordance with this disclosure.

FIGS. 1 through 18, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, depending on three-dimensional (3D) video rendering quality, rendered video such as video game video can include many artifacts. In particular, aliasing artifacts such as jaggy, broken line, or dashed line artifacts are frequent and can cause significant image quality degradation. However, collecting one or more pairs of a degraded image and a high-quality image for training a neural network or other machine learning model is very difficult if a 3D model of the entire game with a rendering system is not available and only rendered 2D images are available. This tends to be the case where a 3D model is only available to the content and/or game provider and the rendering quality control system is not available to client devices.

In some cases, a neural network or other machine learning model may be used to learn how to restore high-quality video from degraded video that includes aliasing. This disclosure provides for training a machine learning model to restore high quality video from degraded video input(s) having aliasing artifacts. The machine learning model can utilize at least one pair of a degraded aliasing image and a high-quality image, which can be geometrically aligned. As noted above, for a device without access to a 3D model for 3D rendering, the only way to capture the pair of a high-quality image and a degraded image may be to capture the 2D rendered frame with different rendering quality settings. However, there may be geometrical alignment issues in this case. Since a graphics processing unit (GPU) can render only one 2D scene image during game play, the high-quality image and the degraded image may be captured at different times, which causes geometrical alignment problems between the two images.

This disclosure also provides various techniques for generating a pair of a degraded (aliasing) image and a high-quality image to be used in training a machine learning model in how to restore high-quality images from degraded images. In various embodiments, these techniques include simulating aliasing artifacts from high-quality images to create simulated degraded images that can be used with their associated high-quality images during training. For this simulation, a set of aliasing images (target images) and a set of high-quality images may be given, but they may not be geometrically aligned and can include different contents. Thus, the techniques of this disclosure include processes for simulating the aliasing artifacts from high-quality images so that the simulated aliasing appears similar to the aliasing in the target images. This disclosure also provides for simulating different types of aliasing artifacts, such as simulating broken thin lines and/or simulating jaggy artifacts without edge transitions.

Various embodiments of this disclosure include training a machine learning model to control aliasing artifacts utilizing pair(s) of high quality and degraded images to teach the machine learning model how to learn to control aliasing artifacts, where a degraded image is generated from a high-quality image and where a degree of artifacts is controlled via an artifact simulation. Various embodiments of this disclosure also include replicating 3D rendering aliasing artifacts without a 3D model and rendering system, such as by providing an artifact simulation to generate 3D rendering artifacts based on 2D high quality rendered images without a 3D model and a rendering system. Various embodiments of this disclosure also include performing a simulation of broken thin lines using an affine transform (2D rotation), such as by using an affine transform to simulate a broken line from an unbroken line in a 2D image, re-projecting the 2D image to a 3D space, and projecting the image back to a 2D image grid by applying a rotation matrix to the 2D image followed by a nearest neighbor interpolation and applying an inverse rotation matrix followed by bi-cubic interpolation. Various embodiments of this disclosure also include performing a simulation of jaggy artifacts without edge transitions, such as by generating an image with a jaggy artifact from a 2D high quality rendered image without an edge transition, where a degree of the jaggy artifact is controllable.

Note that the various embodiments discussed below can be used in any suitable devices and in any suitable systems. Example devices in which the various embodiments discussed below may be used include various consumer electronic devices, such as smartphones, tablet computers, and televisions. However, it will be understood that the principles of this disclosure may be implemented in any number of other suitable contexts.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may perform various functions related to restoring degraded images to high-quality images using a machine learning model. As also described below, the processor 120 may perform various functions related to generating degraded images for use in training a neural network or other machine learning model. For instance, the processor 120 may process high-quality images from a training set to create the degraded images by simulating aliasing artifacts using the high-quality images.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for restoring degraded images to high-quality images using a machine learning model. The application 147 may also include one or more applications for generating degraded images for use in training a neural network or other machine learning model. In some embodiments, the one or more applications 147 can perform such training of the neural network or other machine learning model. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that includes one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform various functions related to restoring degraded images to high-quality images using a machine learning model. As also described below, the server 106 may perform various functions related to generating degraded images for use in training a neural network or other machine learning model. For instance, the server 106 may process high-quality images from a training set to create the degraded images by simulating aliasing artifacts using the high-quality images.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
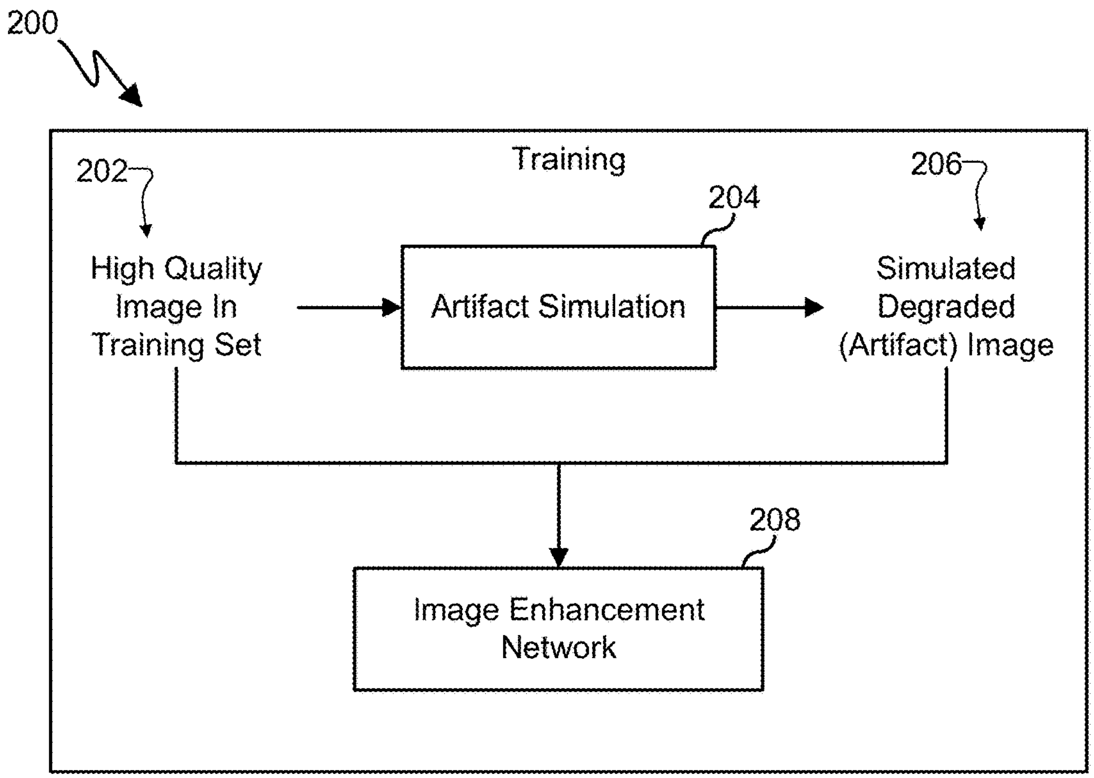
FIG. 2 illustrates an example architecture for training an image enhancement network using simulated degraded images in accordance with this disclosure.

FIG. 2 illustrates an example architecture 200 for training an image enhancement network using simulated degraded images in accordance with this disclosure. For ease of explanation, the architecture 200 shown in FIG. 2 is described as being implemented on or supported by the electronic device 101 in the network configuration 100 of FIG. 1. However, the architecture 200 shown in FIG. 2 could be used with any other suitable device(s) and in any other suitable system(s), such as when the architecture 200 is implemented on or supported by the server 106.

As shown in FIG. 2, the architecture 200 can use a training set including a plurality of high-quality images as ground truth data during training. As described in this disclosure, a user or device typically does not have access to a 3D model for 3D rendering. A degraded image with 3D rendering aliasing artifacts is generally caused by a low rendering quality, while a high-quality image is generated by a high rendering quality from the given 3D model with the corresponding camera matrix. In other words, it would be desirable to have a 3D model with the camera matrix and rendering quality information for each rendered 2D image for use during training. However, this information is not generally available except to content and service providers, such as video game content and service providers. Therefore, this disclosure provides techniques for creating simulated degraded images from the high-quality images in the training dataset for use during training of the network. That is, the architecture 200 generates degraded images of aliasing artifacts directly from 2D high-quality images. For example, the architecture 200 can target different types of aliasing artifacts such as broken thin line artifacts and/or jaggy artifacts without edge transition, which cannot be simulated using conventional artifact simulation methods.

As shown in FIG. 2, a high-quality image 202 from the training set is received and processed using an artifact simulation operation 204. The artifact simulation operation 204 generates a simulated degraded image 206 by introducing one or more types of aliasing artifacts into the high-quality image 202. The simulated degraded image 206 is used with the high-quality image 202 (which was used by the artifact simulation operation 204) to provide a high-quality image and degraded image pair for training an image enhancement network 208. The high-quality image and degraded image pair serve to teach the image enhancement network 208 how, given a degraded image, to enhance the degraded image in order to obtain a high-quality image. That is, the high-quality image in the image pair acts as a ground truth with respect to the type of output image to be achieved, and the degraded image acts as an example input of the types of degraded or artifact images the image enhancement network 208 will encounter during inferencing.

Since the simulated degraded image 206 is generated using the artifact simulation operation 204, this avoids a need to store all the pairs of high-quality images and degraded images for training the image enhancement network 208. Instead, only the high-quality images need to be stored, while the corresponding degraded images can be generated for temporary use during training from the high-quality images. However, it is also possible to store the generated degraded images for later use, if desired. As described in this disclosure, the architecture 200 can control the degree of artifacts introduced during the artifact simulation operation 204, which can make training more efficient and robust. Note that the architecture 200 described above can be used with any desired artifact simulation technique(s) used by the artifact simulation operation 204.

Although FIG. 2 illustrates one example of an architecture 200 for training an image enhancement network using simulated degraded images, various changes may be made to FIG. 2. For example, various components and functions in FIG. 2 may be combined, further subdivided, replicated, or rearranged according to particular needs. Also, one or more additional components and functions may be included if needed or desired. In addition, the images 202 and 206 may be subjected to any desired pre-processing and/or post-processing operation(s).

Figure 3:
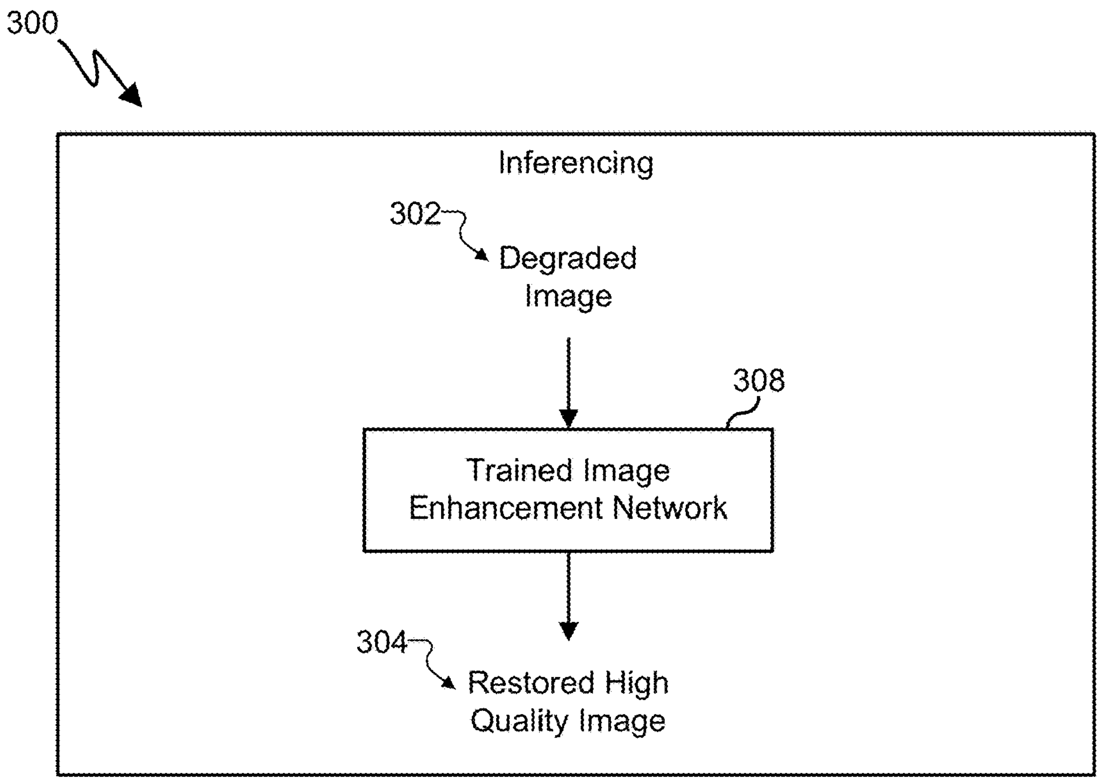
FIG. 3 illustrates an example architecture for inferencing using a trained image enhancement network in accordance with this disclosure.

FIG. 3 illustrates an example architecture 300 for inferencing using a trained image enhancement network in accordance with this disclosure. For ease of explanation, the architecture 300 shown in FIG. 3 is described as being implemented on or supported by the electronic device 101 in the network configuration 100 of FIG. 1. However, the architecture 300 shown in FIG. 3 could be used with any other suitable device(s) and in any other suitable system(s), such as when the architecture 300 is implemented on or supported by the server 106.

As shown in FIG. 3, during inferencing, the goal of the trained image enhancement network is to generate a high-quality image from a degraded image, such as an image including one or more types of aliasing artifacts. Here, a trained image enhancement network 308 receives a degraded image 302 and processes the degraded image 302 according to how the trained image enhancement network 308 was trained, such as described with respect to FIG. 2 in which the image enhancement network is trained using high quality-degraded image pairs. The trained image enhancement network 308 outputs a restored high-quality image 304. As such, the trained image enhancement network 308 can continuously receive degraded 2D images associated with content (such as streamed video game content), process the degraded 2D images as they are received, and output restored high-quality images for display to the user, providing for an enhanced visual experience.

Although FIG. 3 illustrates one example of an architecture 300 for inferencing using a trained image enhancement network 308, various changes may be made to FIG. 3. For example, various components and functions in FIG. 3 may be combined, further subdivided, replicated, or rearranged according to particular needs. Also, one or more additional components and functions may be included if needed or desired. In addition, the images 302 and 304 may be subjected to any desired pre-processing and/or post-processing operation(s).

Figure 4A:
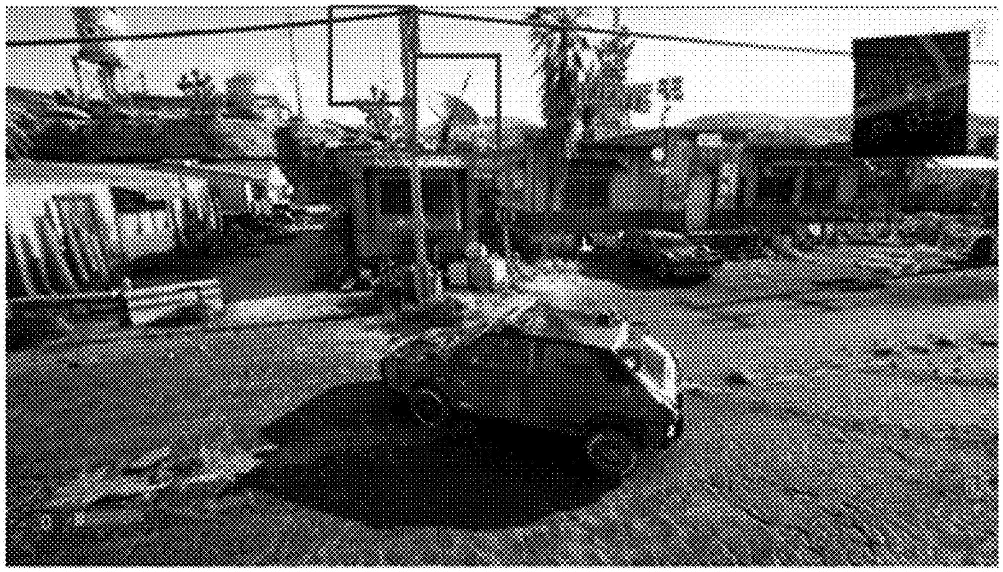
FIGS. 4A through 4C illustrate example high-quality images in accordance with this disclosure.
Figure 4B:
Figure 4C:
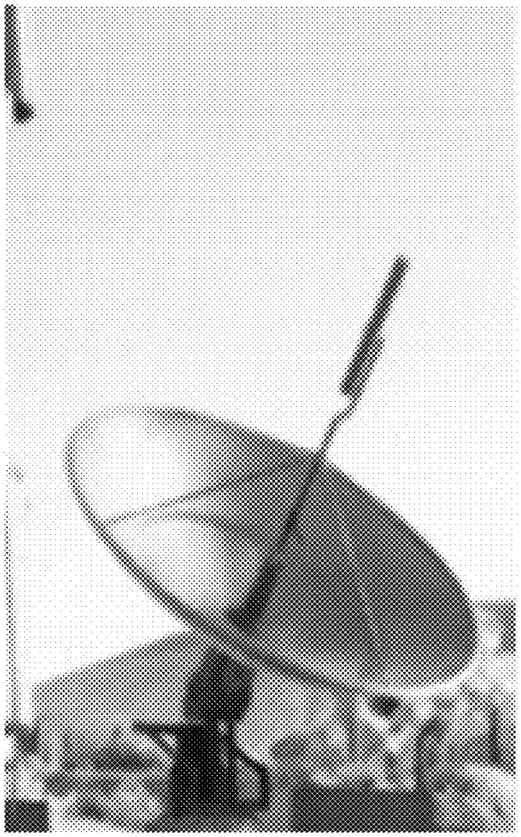
Figure 5A:
FIGS. 5A through 5C illustrate example target aliasing images including broken thin line and jaggy artifacts corresponding to the example high-quality images of FIGS. 4A through 4C in accordance with this disclosure.
Figure 5B:
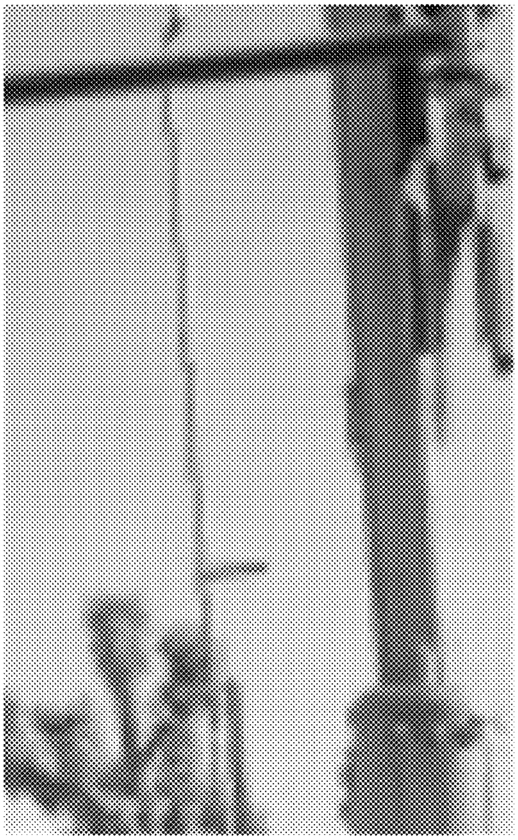
Figure 5C:
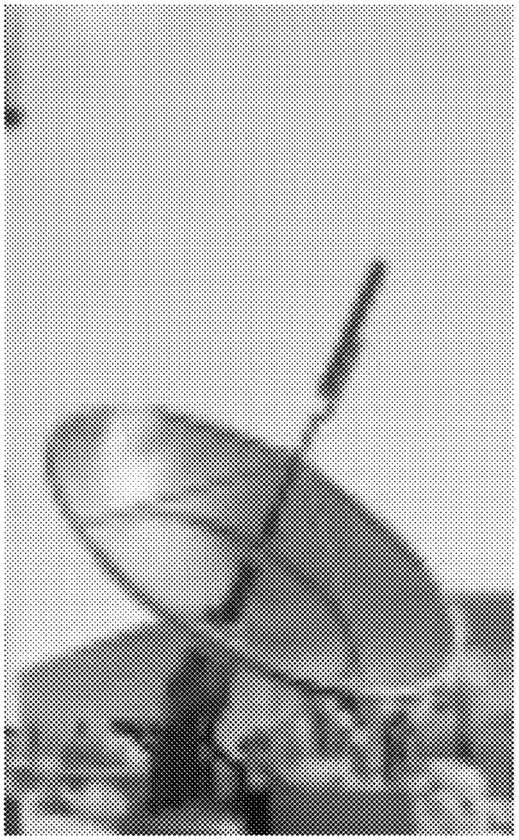

As described in this disclosure, various types of image artifacts can be introduced to generate degraded images for use during training of a network, such as during the training of the image enhancement network 208 described with respect to FIG. 2. For example, FIGS. 4A through 4C illustrate example high-quality images in accordance with this disclosure. FIGS. 5A through 5C illustrate example target aliasing images including broken thin line and jaggy artifacts corresponding to the example high-quality images of FIGS. 4A through 4C in accordance with this disclosure.

FIG. 4A shows a high-quality image 401 depicting a rendered environment or scene having objects in the background that are made up of one or more thin lines. FIGS. 4B and 4C show zoomed-in images 402 and 403, respectively, of the high-quality image 401, each showing example structures from the environment or scene. For example, the image 402 of FIG. 4B shows a generally-vertical thin pole in the environment, and the image 403 of FIG. 4C shows a satellite dish in this example. The high-quality images 401, 402, and 403 represent the types of images that can be used as inputs to an artifact simulation operation during training of a network as described in this disclosure or can represent the types of images output by a trained network during inferencing as described in this disclosure.

FIG. 5A shows a degraded image 501 corresponding to the environment depicted in the high-quality image 401 but in which objects (such as the objects shown in the high-quality images 402 and 403 of FIGS. 4B and 4C) are degraded by aliasing artifacts. For example, the image 502 of FIG. 5B shows the generally-vertical pole in the environment. However, as can be seen in FIG. 5B, the pole is degraded in that it is shown as a broken thin line. The image 403 of FIG. 4C provides an example of how portions of an image can have generally jaggy artifacts, causing overall jaggy and blurred effects on image details. The degraded images 501, 502, and 503 represent the types of images that can be used as inputs to a trained network during inferencing as described in this disclosure or can represent the types of images produced by an artifact simulation operation during training of a network as described in this disclosure.

Broken thin line artifacts are a type of aliasing artifact often displayed by game streaming services. Since the images 401 and 501 are rendered in different settings and different times, they are not geometrically aligned. Therefore, to generate the pair of aliasing image and high-quality image, an artifact simulation operation, such as the artifact simulation operation 204, can mimic similar aliasing artifacts of the target image using the high-quality image. The broken line artifact shown in FIG. 5B is not easily simulated. That is because the partially broken line may be caused during 3D model rendering, and the 3D model is not available to client devices. To simulate broken line artifacts such as shown in the example image of FIG. 5B, the artifact simulation operation can perform an affine transform on the high-quality image followed by a sampling or interpolation operation (such as a nearest neighbor operation) and an inverse affine transform followed by another interpolation operation (such as a bicubic interpolation operation). The artifact simulation operation can also introduce general jaggy artifacts, such as shown in FIG. 5C, which can be simulated using down-sampling.

Although FIGS. 4A through 4C illustrate examples of high-quality images and FIGS. 5A through 5C illustrate examples of target aliasing images including broken thin line and jaggy artifacts corresponding to the example high-quality images of FIGS. 4A through 4C, various changes may be made to FIGS. 4A through 5C. For example, although the images 401 through 503 are of a particular scene or environment and of objects in the particular scene or environment, various other scenes or environments and objects therein could be the subject of the images. For instance, generally, structures having thin lines can be present in many environments, and the techniques described in this disclosure for introducing broken thin line artifacts and/or general jaggy artifacts can be used for a large variety of image content.

Figure 6:
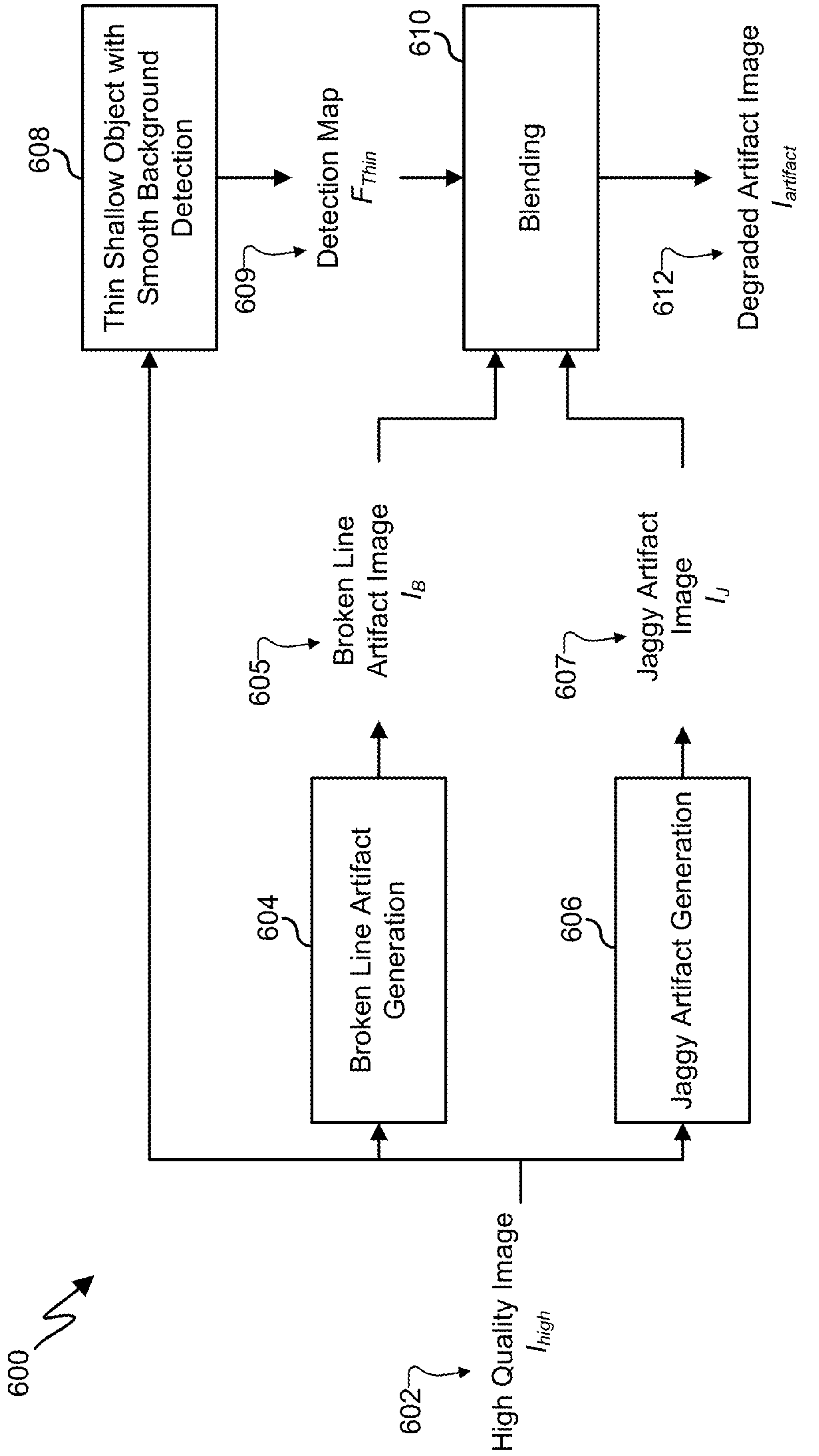
FIG. 6 illustrates an example artifact simulation architecture in accordance with this disclosure.

FIG. 6 illustrates an example artifact simulation architecture 600 in accordance with this disclosure. For ease of explanation, the artifact simulation architecture 600 shown in FIG. 6 is described as being implemented on or supported by the electronic device 101 in the network configuration 100 of FIG. 1. However, the artifact simulation architecture 600 shown in FIG. 6 could be used with any other suitable device(s) and in any other suitable system(s), such as when the artifact simulation architecture 600 is implemented on or supported by the server 106.

It will be understood that the artifact simulation architecture 600 can be used as at least part of the artifact simulation operation 204 during training of an image enhancement network, such as described with respect to FIG. 2. As shown in FIG. 6, the artifact simulation architecture 600 takes as input a high-quality image 602 (denoted as $I_{high}$) into various operations of the artifact simulation architecture 600. In some embodiments, the degraded aliasing artifact image to be produced can include two different types of aliasing artifacts, namely broken line artifacts and general jaggy artifacts, such as described with respect to FIGS. 4A through 5C. Therefore, the high-quality image 602 can be input to both a broken line artifact generation operation 604 and a jaggy artifact generation operation 606. The broken line artifact generation operation 604 generates a broken line artifact image 605 (denoted as $I_B$), and the jaggy artifact generation operation 606 generates a jaggy artifact image 607 (denoted as $I_J$).

The high-quality image 602 is also input to a thin shallow object with smooth background detection operation 608. The operation 608 uses a region detection process for the aliasing artifact. The broken line artifact type can occur when images have very thin objects around a smooth background. Since the angle of the thin object tends to be very shallow, meaning that the thin object is close to a vertical angle or a horizontal angle but not entirely vertical or horizontal, the artifact simulation architecture 600 can generate a detection map 609 (denoted as $F_{Thin}$) using the operation 608. Once the broken line artifact image 605, the jaggy artifact image 607, and the detection map 609 are generated, a blending operation 610 is performed to simulate the broken thin line artifacts in the image by blending the two different images 605 and 607 using the detection map 609. The blending operation 610 produces a degraded artifact image 612 (denoted as $I_{artifact}$) that includes the introduced artifacts. As described in this disclosure, the degraded artifact image 612 can be used with the high-quality image 602 during training of a machine learning model. It will be understood that the artifact simulation architecture 600 can be performed any number of times on any number of high-quality images to create a plurality of pairs of high-quality images and degraded images to be used for training.

The following now describes how various operations in the architecture 600 may operate in specific embodiments of this disclosure. The following details are for illustration and explanation only and do not limit the scope of this disclosure to these specific embodiments or details.

In some embodiments, the high-quality image 602 ($I_{high}$) is received by the architecture 600, and the broken line artifact generation operation 604 is performed on the high-quality image 602 to create the broken line artifact image 605 ($I_B$). In some cases, the mathematical modeling for broken line artifact generation can be derived as follows. To simulate a broken line using a 2D high-quality image, the 3D rendering model can be defined as follows.

$$I(D(PS)) = I_{3D}(S)$$

Here, I is a 2D image, $I_{3D}$ is a 3D image, S is 3D pixel coordinates, P is a camera matrix, and D is a degradation model. Note that the degradation model D models a sampling process on the 2D image. Using this model, the 2D high-quality image ($I_{high}$) can be rendered from the 3D image as follows.

$$I_{high} = O(D_1(PS)) = I(x_{high})$$

Here, $x_{high}$ is high-quality image coordinates, and $D_1$ is a degradation model for the high-quality image. Similarly, the low quality 2D image (broken line image) can be modelled as follows.

$$I_{low} = I(D_2(PS)) = I(x_{low})$$

Here, $I_{low}$ is the low quality (broken line artifact) 2D image, $x_{low}$ is low quality image coordinates, and $D_2$ is a degradation model for the low quality image. Based on the above, it can be seen that the following equations can define the relationship between $x_{low}$ and $x_{high}$.

$$I(PS) = I\left(D_2^{-1}(x_{low})\right) = I\left(D_1^{-1}(x_{high})\right)$$

$$x_{low} = D_2\left(D_1^{-1}(x_{high})\right) = D_3(x_{high})$$

As mentioned above, degradation models ($D_1$ and $D_2$) sample the 2D continuous coordinates (PS) onto a discrete 2D image grid. Since $x_{high}$ is the 2D image coordinates of the high-quality rendered image, $$D_3\left( = D_2 \circ D_1^{-1}\right)$$

converts $x_{high}$ to a continuous coordinate first. Simulating broken thin lines from normal thin lines in a 2D image is challenging because these artifacts would occur when the 3D model is projected onto some 2D image planes with inappropriate sampling/interpolation. Since the operation 604 only has access to the high-quality image 602, which already samples/interpolates the projected 3D scenes on the image grid, simulating broken line artifacts becomes a difficult process. This disclosure provides, however, a technique that includes applying sampling/interpolation on the already-sampled 2D high-quality image 602. In some cases, to convert $x_{high}$ to continuous coordinates, the broken line artifact generation operation 604 applies an affine transform (H) operation (such as 2D rotation) on $x_{high}$, followed by a sampling/interpolation operation (such as nearest neighbor (NN)) to synthesize the transformed image on a new image grid as shown below.

$$x_{low} = M_{nearest}(Hx_{high})$$

Here, $M_{nearest}$ is the nearest interpolation.

Figure 7:
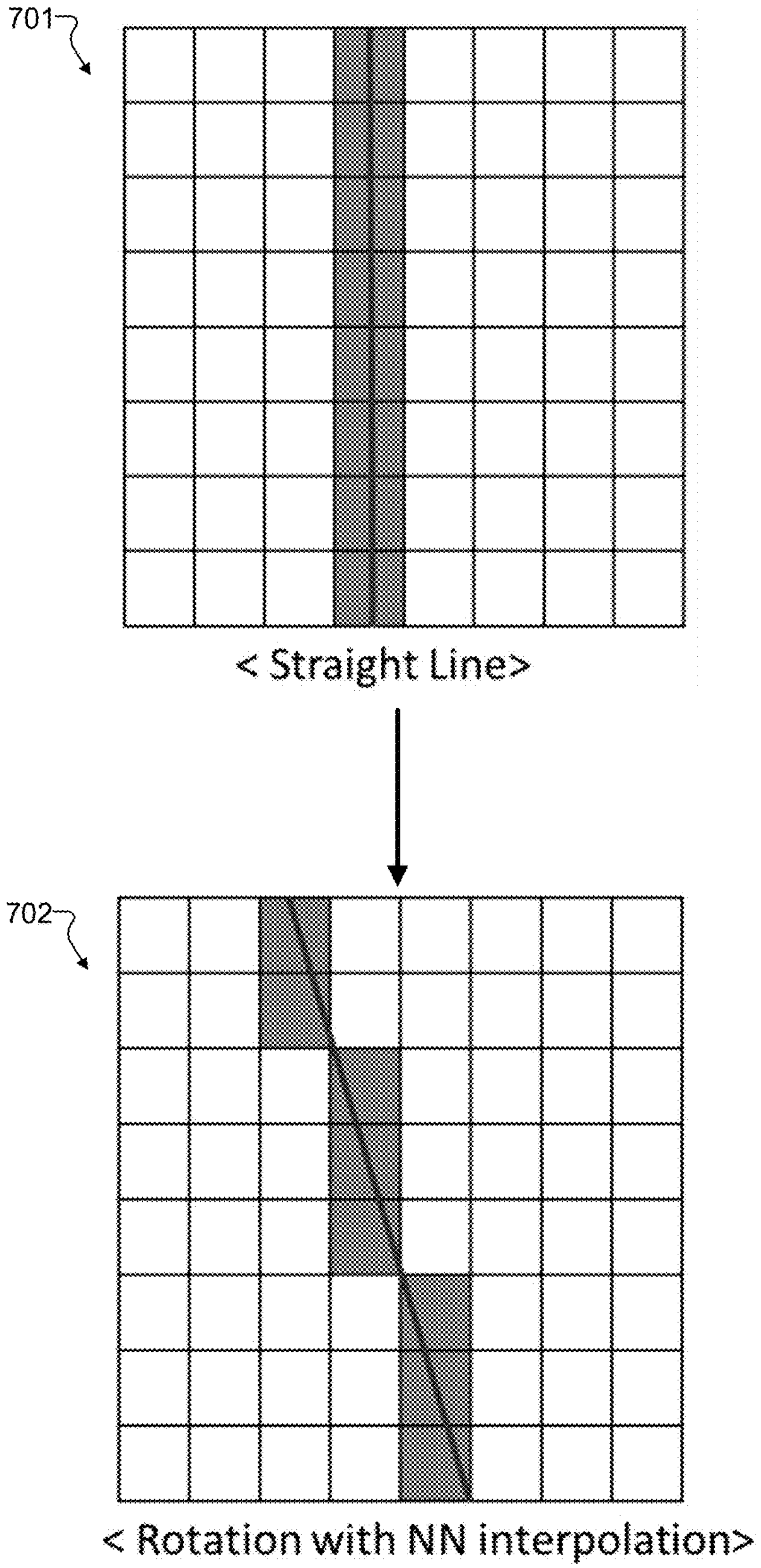
FIG. 7 illustrates an example broken line generation using an affine transform and interpolation in accordance with this disclosure.

FIG. 7 illustrates an example broken line generation using an affine transform and interpolation in accordance with this disclosure. As shown in FIG. 7, a straight line sampled onto a 2D grid 701 has an affine transform with interpolation operation performed on it as described above. This causes the straight line to be broken as shown in the 2D grid 702. For the affine transform, in some embodiments, the broken line artifact generation operation 604 can use a 2D rotation matrix because rotating a thin line followed by sampling on an image grid can cause a better broken line effect and because the degree of the artifact can be controlled using one parameter (such as rotation angle).

Note, however, that the transformed image may have a different geometric alignment with the original high-quality image 602. To align the degraded image with the high-quality image 602 (thus maintaining the same geometrical alignment with high-quality image), the broken line artifact generation operation 604 can apply an inverse affine transform to the transformed image followed by another interpolation (such as bi-cubic interpolation). When inverse affine transform is applied, the coordinates are changed back to continuous coordinates. To map the coordinates back into 2D image grid again, bi-cubic interpolation can be applied. In some cases, the inverse transform and bicubic interpolation can be expressed as follows.

$$x_{low} = M_{bicubic}\left(H^{-1}(Hx_{high})\right)$$

Here, $M_{bicubic}$ is bi-cubic interpolation.

Thus, in some embodiments, the broken line artifact image 605 ($I_B$) can be generated using the following operations.

(1) Apply a 2D affine transform by applying an affine matrix (such as a 2D rotation matrix) to the input and use nearest neighbor interpolation to sample the rotated input to an image grid, which can be expressed as follows.

$$H = \begin{bmatrix} \cos\theta & -\sin\theta \\ \sin\theta & \cos\theta \end{bmatrix}$$

(2) Apply an inverse 2D transform by applying an inverse rotation matrix followed by bi-cubic interpolation to keep the same geometrical alignment with the original input image, which can be expressed as follows.

$$H^{-1} = \begin{bmatrix} \cos(-\theta) & -\sin(-\theta) \\ \sin(-\theta) & \cos(-\theta) \end{bmatrix}$$

The degree of the artifact can be controllable by the angle $\theta$ (such as when a larger $\theta$ generates more broken lines). As described above, to generate the final output degraded artifact image 612, the broken line artifact image 605 is blended in the blending operation 610 using the detection map 609 with a jaggy artifact image 607 that includes general jaggy artifacts introduced into the image. In various embodiments, to create the jaggy artifact image 607, the jaggy artifact generation operation 606 can perform a 2× down-sampling operation on the high-quality image 602 using, for example, nearest neighbor down-sampling, and the jaggy artifact generation operation 606 can perform a 2× up-sampling on the image, such as using bicubic up-sampling.

To create the detection map 609, the thin shallow object with smooth background detection operation 608 can perform a thin object detection and a smooth background detection. The thin object detection can include performing, for example, a canny edge detection ($E_{canny}$), a morphological closing ($E_{canny/close}$), a thin object region ($E_{thin}$) detection (which can include subtracting the edge detection from the morphological closing ($E_{sub}$=$E_{canny/close}$−$E_{canny}$)), and a morphological dilation on the subtracted region ($E_{thin}$=dilate ($E_{sub}$)).

The smooth background ($E_{sb}$) detection can include counting a number of edge pixels from the canny edge map ($E_{canny}$) within a window (such as a 9×9 window). If the number of edge pixels is smaller than a threshold, the operation 608 can determine that a current pixel has a smooth background, and the operation 608 can perform a shallow thin object detection with a smooth background ($E_{sh\text{-}thin/sb}$). On the region where a thin object with smooth background ($E_{thin/sb}=E_{thin}\cap E_{sb}$) is present, the operation 608 can additionally determine an orientation of pixel gradients on a grayscale image and determine a number of pixels within a larger window (such as a 15×15 window) that have an orientation gradient close to 0°, 90°, or 180° but not equal to 0°, 90°, or 180°. If the number of pixels satisfying the shallow angle within the larger window is greater than a threshold, the operation 608 keeps the region. Otherwise, the operation 608 removes that region from the detection map 609.

In order to combine the artifacts introduced in both the broken line artifact image 605 and the jaggy artifact image 607, the blending operation 610 blends the broken line artifact image 605 ($I_B$) with the jaggy artifact image 607 ($I_J$) using the detection map ($F_{Thin}$) (such as the shallow thin object with smooth background map ($E_{sh\text{-}thin/sb}$)). In some cases, the blending can be expressed as follows.

$$I_{artifact} = I_B \cdot E_{sh-thin/sb} + I_J \cdot (1 - E_{sh-thin/sb})$$

The degraded artifact image 612, which is the final blended image ($I_{artifact}$), is output by the blending operation 610.

Figure 8A:
FIGS. 8A through 8F illustrate example input images, degraded artifact images, and corresponding detection maps in accordance with this disclosure.
Figure 8B:
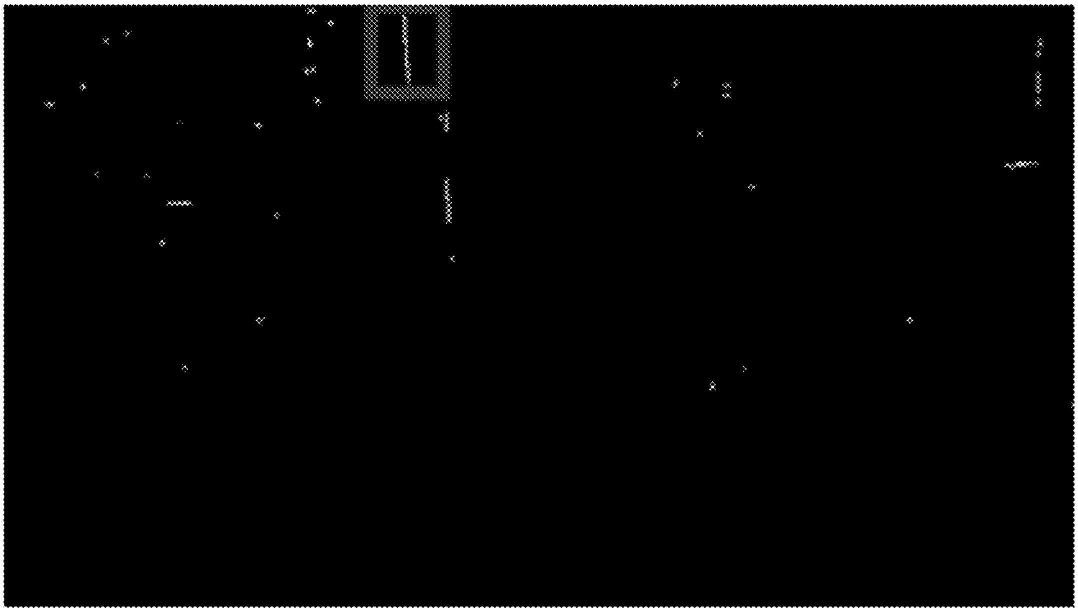

For illustration, FIGS. 8A through 8F illustrate example input images, degraded artifact images, and corresponding detection maps in accordance with this disclosure. FIG. 8A shows an example high-quality image input 801 having a thin line object in the background. FIG. 8B shows a feature detection map 802, such as one that can be generated using the thin shallow object with smooth background detection operation 608. As shown in FIG. 8B, the feature detection map 802 emphasizes features in the environment or scene that have thin line object characteristics.

Figure 8E:
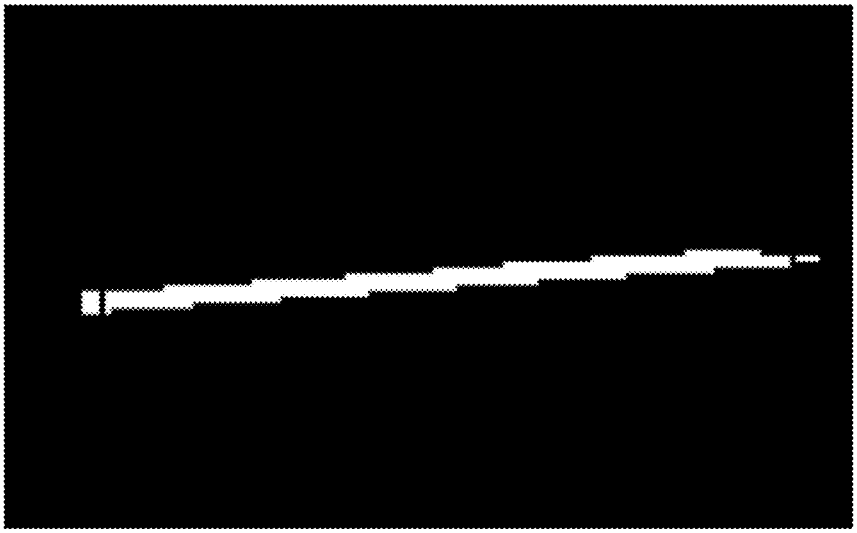
Figure 8D:
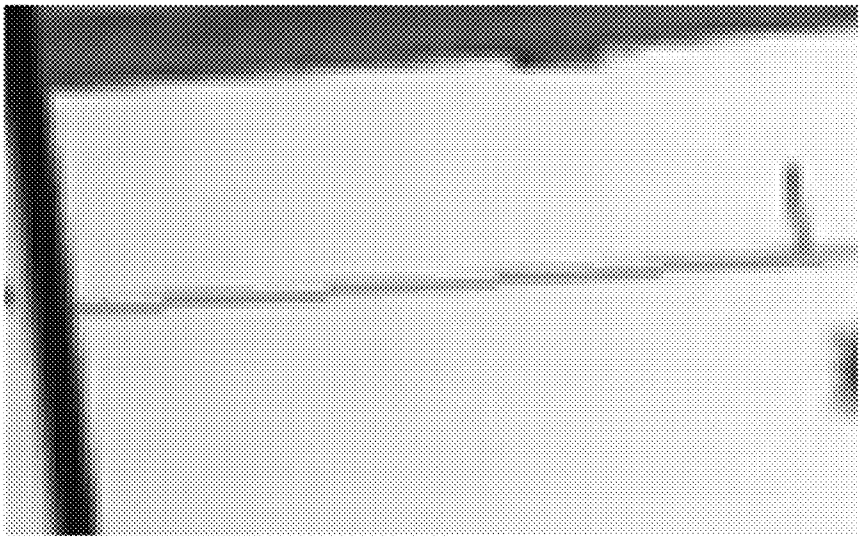
Figure 8C:
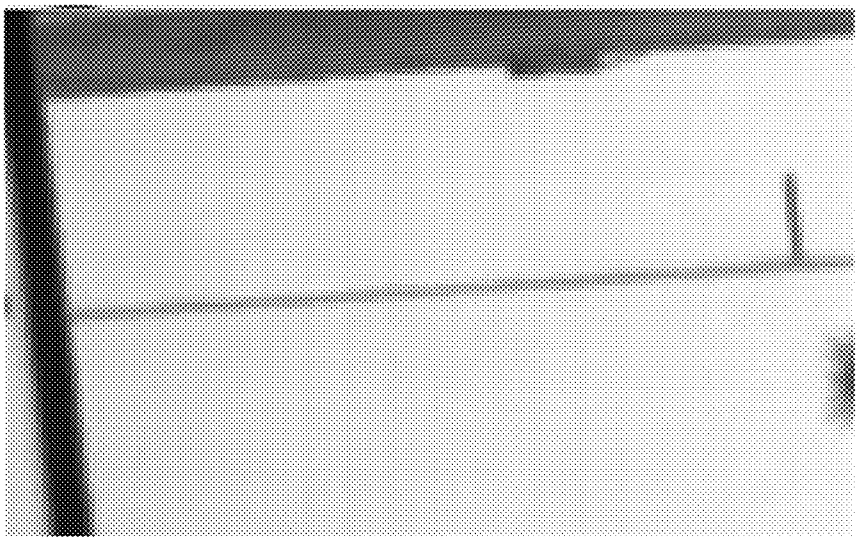
Figure 8F:
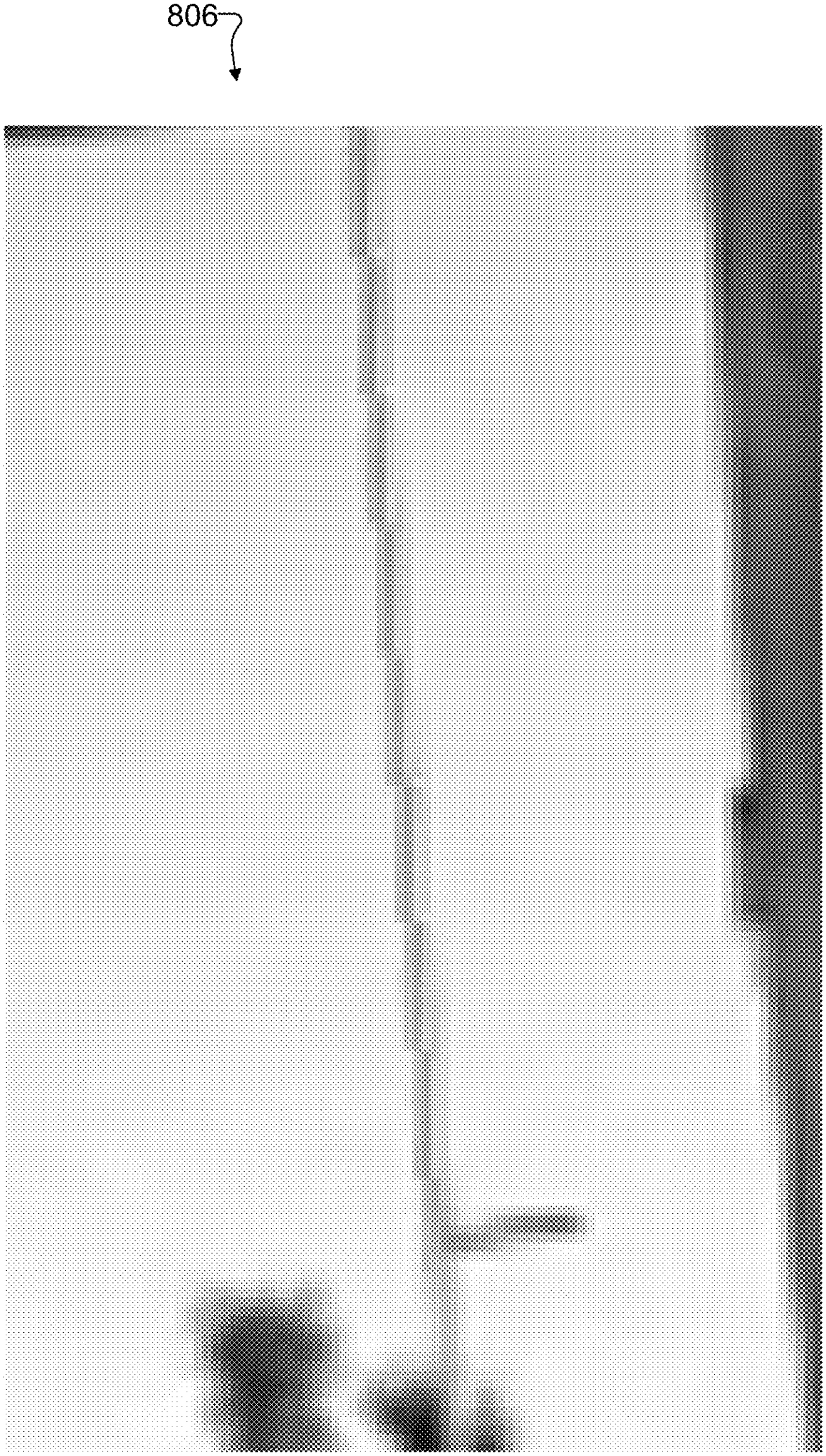

FIG. 8C shows an image 803 of a zoomed-in portion of the high-quality image input 801 showing a thin line object in the environment or scene. For comparison, FIG. 8D shows an image 804 of a zoomed-in portion of a degraded image, such as one created using the architecture 600 (like in a degraded artifact image 612). As shown in FIG. 8D, the thin line object is now a broken line artifact object, where the thin line object has been made to have a stepped, jagged visual effect. FIG. 8E illustrates a zoomed-in portion of a detection map 805 corresponding to the image 804 of FIG. 8D, which serves to further illustrate and visualize the broken line effect of the broken line object. As described above, the degree of the artifact can be controllable by the angle θ, such as when larger values of θ generate more broken lines. For example, FIG. 8F shows an image 806 where the thin line object is transformed to a higher degree. As compared to the image 804 of FIG. 8D where a 2° angle is used, the image 806 of FIG. 8F shows the resulting broken line artifact where a 4° angle is used.

Although FIG. 6 illustrates one example of an artifact simulation architecture 600, various changes may be made to FIG. 6. For example, various components and functions in FIG. 6 may be combined, further subdivided, replicated, or rearranged according to particular needs. Also, one or more additional components and functions may be included if needed or desired. In addition, the images 602, 605, 607, 612 may be subjected to any desired pre-processing and/or post-processing operation(s). Although FIG. 7 illustrates an example broken line generation using an affine transform and interpolation, various changes may be made to FIG. 7. For example, although a line is shown as residing in a particular location of the 2D grid in FIG. 7, the line could reside at other locations on the grid. Although FIGS. 8A through 8F illustrate examples of input images, degraded artifact images, and corresponding detection maps, various changes may be made to FIGS. 8A through 8F. For example, although the images 801 through 806 are of a particular scene or environment and/or of objects in the particular scene or environment, various other scenes or environments and objects therein could be the subject of the images.

Figure 9A:
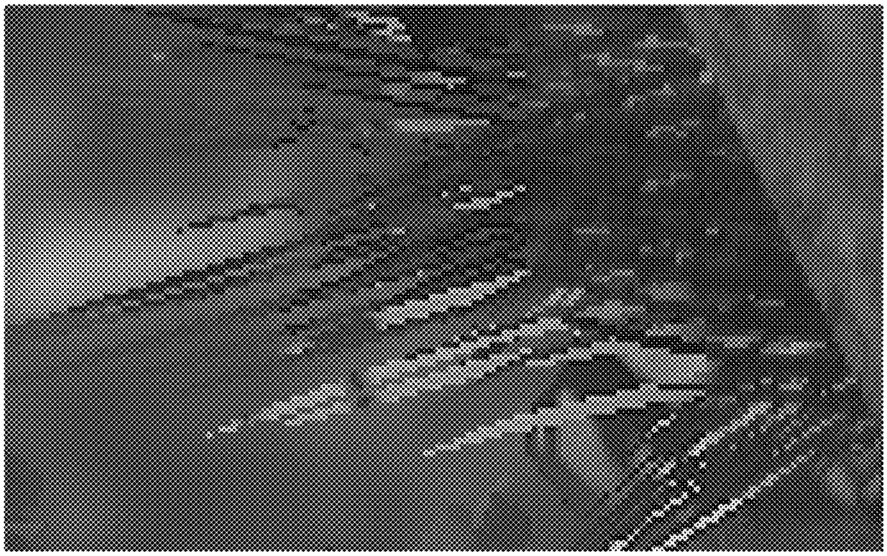
FIGS. 9A through 9C illustrate example aliasing images including jaggy artifacts without edge transitions in accordance with this disclosure.
Figure 9B:
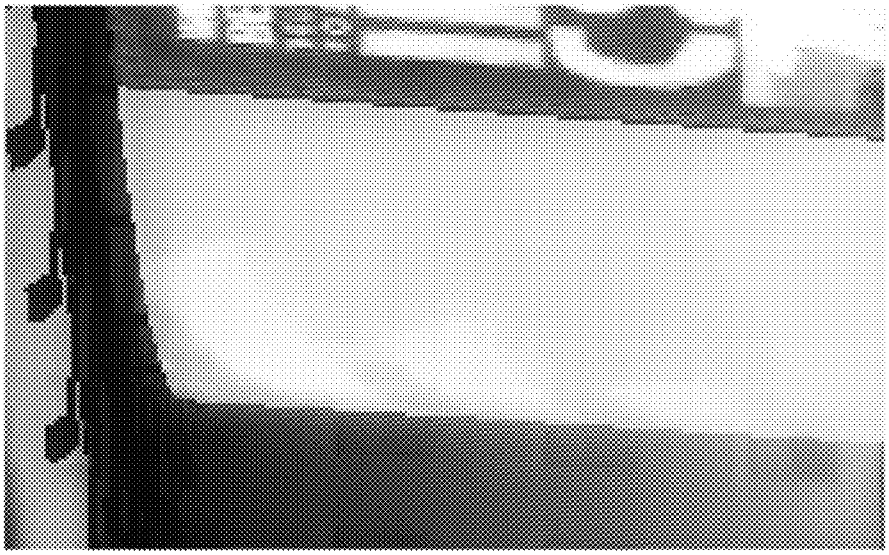
Figure 9C:
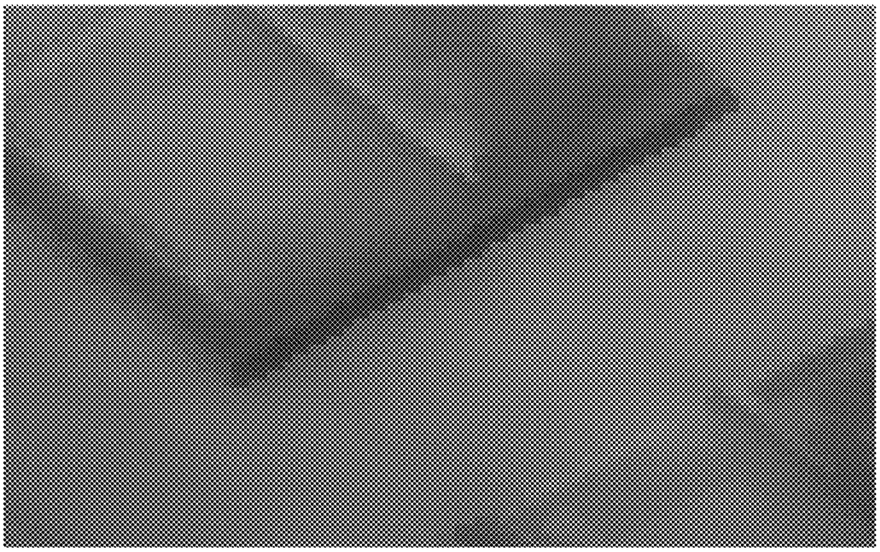

As described in this disclosure, various types of image artifacts can be introduced to generate degraded images for use during training of a network, such as during the training of the image enhancement network 208 described with respect to FIG. 2. For example, FIGS. 9A through 9C illustrate example aliasing images including jaggy artifacts without edge transitions in accordance with this disclosure. More specifically, FIG. 9A shows an image 901 of grass having jaggy artifacts, FIG. 9B shows an image 902 of a portion of a screen having jaggy artifacts, and FIG. 9C shows an image 903 of a wall texture with rectangular structures having jaggy artifacts. Different from the broken lines or general jaggy artifacts, this type of jaggy artifact shown in FIGS. 9A through 9C does not include any transition area(s) around edges. In other words, the artifact produces very sharp jaggy edges against a smooth background. This type of artifact can be generated during 3D game rendering without appropriate interpolation. Since many rendered images projected on a 2D plane include interpolations, it is not trivial to acquire this type of target image. Therefore, this disclosure provides a process to simulate jaggy artifacts without edge transitions.

When a 3D object with a background is projected onto a 2D image plane, the edges of the object can be well-sampled and interpolated to avoid aliasing. If inappropriate interpolation is applied, jaggy artifacts without edge transitions can occur. Since the input (such as high quality 2D image) can already include the appropriate interpolation around edges, the artifact simulation techniques of this disclosure can remove the interpolation. Also, the simulation techniques can control the degree of jaggy artifacts without edge transitions.

Although FIGS. 9A through 9C illustrate examples of aliasing images including jaggy artifacts without edge transitions, various changes may be made to FIGS. 9A through 9C. For example, although the images 901 through 903 are of particular scenes or environments and/or of objects in the particular scenes or environments, various other scenes or environments and objects therein could be the subject of the images. For instance, structures having jaggy edges without edge transitions can be present in many environments, and the techniques described in this disclosure for introducing jaggy edges without edge transitions can be used for a large variety of image content.

Figure 10:
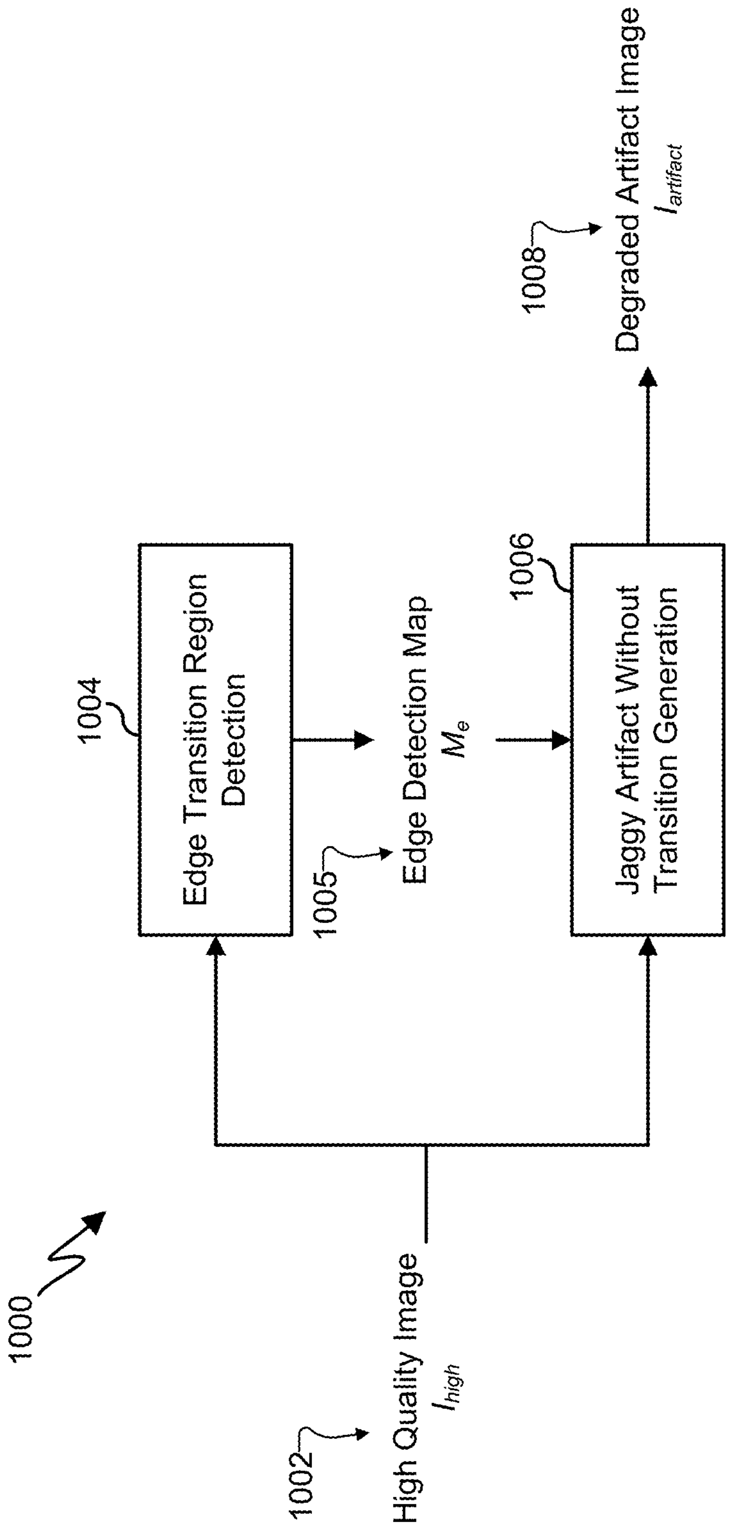
FIG. 10 illustrates an example artifact simulation architecture in accordance with this disclosure.

FIG. 10 illustrates an example artifact simulation architecture 1000 in accordance with this disclosure. For ease of explanation, the artifact simulation architecture 1000 shown in FIG. 10 is described as being implemented on or supported by the electronic device 101 in the network configuration 100 of FIG. 1. However, the artifact simulation architecture 1000 shown in FIG. 10 could be used with any other suitable device(s) and in any other suitable system(s), such as when the artifact simulation architecture 1000 is implemented on or supported by the server 106.

It will be understood that the artifact simulation architecture 1000 can be used as at least part of the artifact simulation operation 204 during training of an image enhancement network, such as described with respect to FIG. 2. As shown in FIG. 10, the artifact simulation architecture 1000 takes as input a high-quality image 1002 (denoted as $I_{high}$) into various operations of the artifact simulation architecture 1000. For example, the high-quality image 1002 can be input to both an edge transition region detection operation 1004 and a jaggy artifact without transition generation operation 1006. The edge transition region detection operation 1004 generates an edge detection map 1005 (denoted as $M_e$). The jaggy artifact without transition region generation operation 1006 generates, using the high-quality image 1002 and the edge detection map 1005, a degraded artifact image 1008 (denoted as $I_{artifact}$).

The following now describes how various operations in the architecture 1000 may operate in specific embodiments of this disclosure. The following details are for illustration and explanation only and do not limit the scope of this disclosure to these specific embodiments or details.

In some embodiments, the edge transition region detection operation 1004 can detect edges on the high-quality image 1002 and dilate the edge regions but can exclude horizontal and vertical edge regions. Also, in some embodiments, the jaggy artifact without transition generation operation 1006 uses the edge detection map 1005 with the input high-quality image 1002 to find a current pixel in the detection map and check if the neighbor pixels of the current pixel have similar colors with the current pixel. Note that if the neighbor pixels are within the edge detection map 1005, they do not have to be considered for checking color similarity. If there is a neighbor pixel that has similar color with the current pixel, the jaggy artifact without transition generation operation 1006 can replace the current pixel with the neighbor pixel. Since the pixels within an edge transition region are detected, the jaggy artifact without transition generation operation 1006 can remove the edge transition, causing jaggy artifacts. As described in this disclosure, the degraded artifact image 1008 can be used with the high-quality image 1002 during training of a machine learning model. It will be understood that the artifact simulation architecture 1000 can be performed any number of times on any number of high-quality images to create a plurality of pairs of high-quality images and degraded images to be used for training.

In particular embodiments, the edge transition region detection operation 1004 can perform edge transition region detection by performing a canny edge detection on a grayscale image and a morphological dilation on the detected edge region. The operation 1004 can exclude horizontal and vertical edges by using the same approach as the shallow edge detection described with respect to FIG. 6 but with a different angle. On the dilated edge regions, the operation 1004 can additionally determine the orientation of pixel gradients on a grayscale image and determine the number of pixels within a window (such as a 5×5 window) whose absolute orientation gradient is very close to 0°, 90°, or 180°. If the number of pixels satisfying the above criteria is greater than a threshold, the operation 1004 removes the pixels from the dilated edge regions. The dilated edge detection map 1005 that excludes horizontal/vertical edges can be output by the operation 1004.

In some embodiments, the jaggy artifact without transition generation operation 1006 can perform jaggy artifact generation with transitions by performing the following operations.

(1) The operation 1006 generates an artifact image ($I_{artifact}(i,j,c)$) that is the same as the RGB high-quality image 1002 ($I_{high}(i,j,c)$).

(2) For the $(i,j)^{th}$ pixel of the high-quality image 1002 ($I_{high}(i,j,c)$), where $M_e(i,j)=1$, the operation 1006 finds the minimum L1 distance ($d_{ii,jj}$) between the $I_{high}(i,j,c)$ pixel and the $I_{high}(i+ii,j+jj,c)$ pixel within the 5×5 or other window. Note that the neighbor pixels within the 5×5 or other window of the $(i,j)^{th}$ pixel can have $M_e(ii,jj)=0$. This can be expressed as: $(ii_{min}, jj_{min}) = \text{argmin}_{(ii,\ jj)} d_{ii,jj}$, where $$d_{ii,jj} = \Sigma_{c\in\{R,G,B\}}|I_{high}(i, j, c) - I_{high}(i+ii, j+jj, c)| \text{ and } -2 \le ii, jj \le 2 \text{ and } M_e(ii, jj) = 0. \tag{3}$$

If $d_{ii_{min},jj_{min}} < T_{min}$, replace the $I_{artifact}(i, j, c)$ with $I_{high}(i+ii_{min}, j+jj_{min}, c)$.

Operations (2) and (3) above are iterated for the $(i,j)^{th}$ pixel of $I_{high}(i,j,c)$ where $M_e(i,j)=1$. The degree of artifact can be controlled by the threshold $T_{min}$. The resulting degraded artifact image 1008 is output by the operation 1006.

Figure 11C:
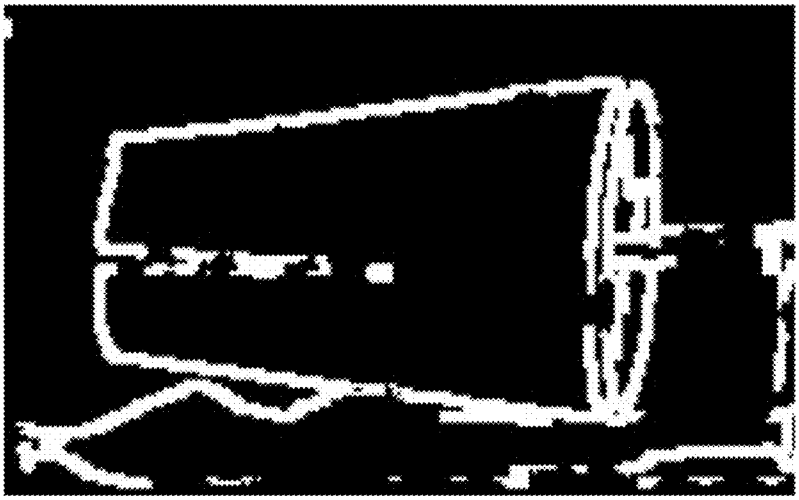
FIGS. 11A through 11C illustrate an example input image, an example degraded artifact image, and an example corresponding detection map in accordance with this disclosure.
Figure 11B:
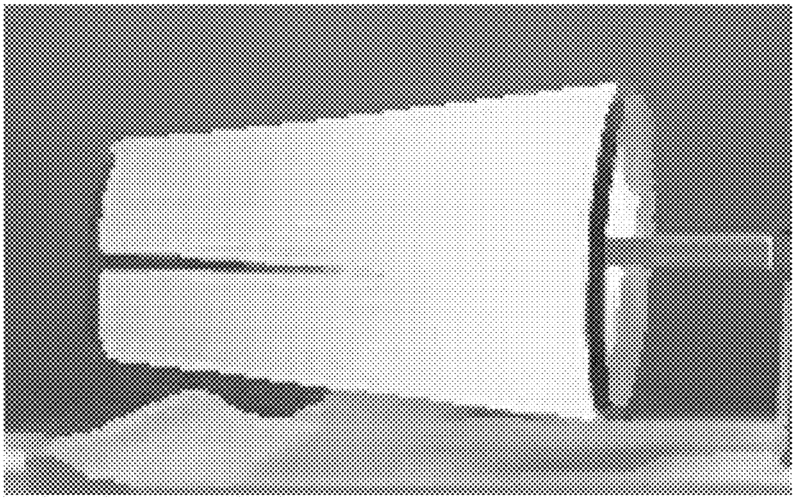
Figure 11A:
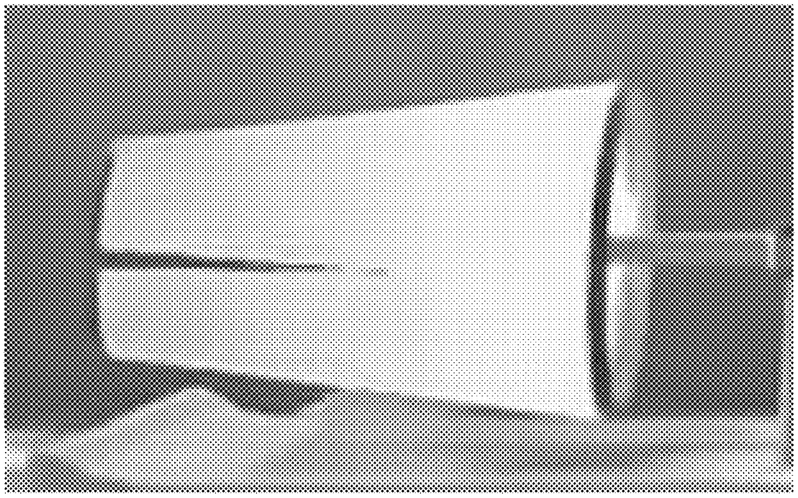

For illustration, FIGS. 11A through 11C illustrate an example input image, an example degraded artifact image, and an example corresponding detection map in accordance with this disclosure. More specifically, FIG. 11A shows an example high-quality input image 1101 that includes an object against a smooth background, in this case a lampshade pictured in front of a wall. FIG. 11B shows an image 1102 in which the edges of the object now have a jagged visual effect, where it appears that the smooth background cuts into the object around the perimeter of the object as emphasized in comparison with the image 1101 of FIG. 11A. FIG. 11C shows a feature detection map 1103, such as can be generated using the edge transition region detection operation 1004. As shown in FIG. 11C, the feature detection map 1103 emphasizes the jaggy features of the object shown in the image 1102 of FIG. 11B.

Figure 12C:
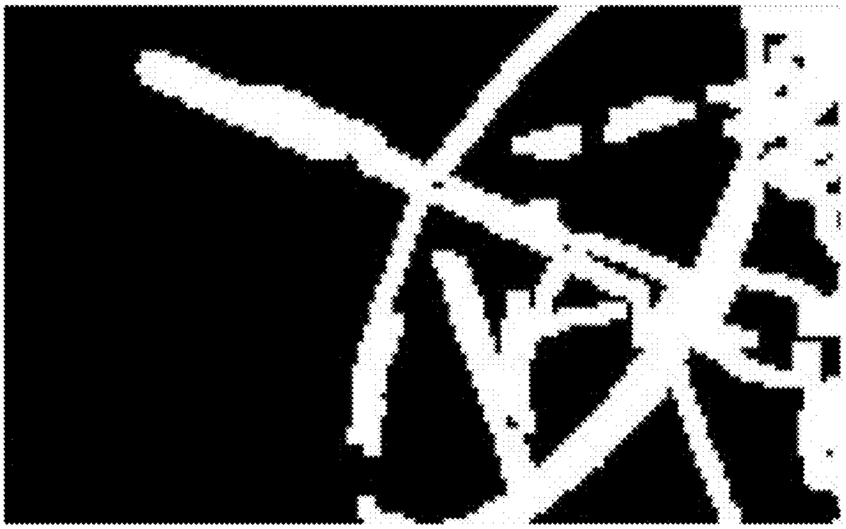
FIGS. 12A through 12C illustrate another example input image, another example degraded artifact image, and another example corresponding detection map in accordance with this disclosure.
Figure 12B:
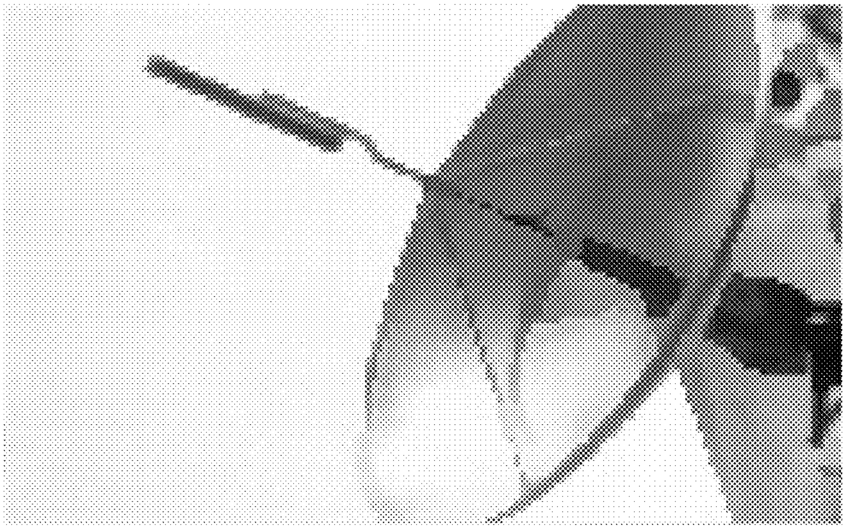
Figure 12A:
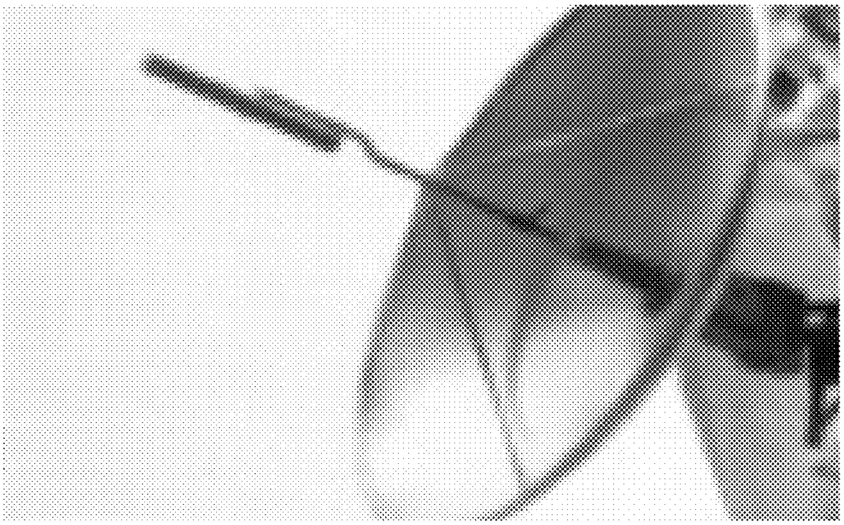

As additional illustration, FIGS. 12A through 12C illustrate another example input image, another example degraded artifact image, and another example corresponding detection map in accordance with this disclosure. More specifically, FIG. 12A shows an example high-quality input image 1201 that includes an object against a smooth background, in this case a satellite dish pictured in front of the sky. FIG. 12B shows an image 1202 in which the edges of the object now have a jagged visual effect, where it appears that the smooth backgrounds cuts into the object around the perimeter of the object as emphasized in comparison with the image 1201 of FIG. 12A. FIG. 12C shows a feature detection map 1203, such as can be generated using the edge transition region detection operation 1004. As shown in FIG. 12C, the feature detection map 1203 emphasizes the jaggy features of the object shown in the image 1202 of FIG. 11B.

Although FIG. 10 illustrates one example of an artifact simulation architecture 1000, various changes may be made to FIG. 10. For example, various components and functions in FIG. 10 may be combined, further subdivided, replicated, or rearranged according to particular needs. Also, one or more additional components and functions may be included if needed or desired. Further, the images 1002, 1008 may be subjected to any desired pre-processing and/or post-processing operation(s). In addition, in various embodiments, the artifact simulation architecture 1000 and the artifact simulation architecture 600 can be combined such that the artifact simulation operation 204 can include both architectures 600 and 1000. In such embodiments, the degraded artifact image 612 can be combined with the degraded artifact image 1008, such as through an additional blending operation, to create a degraded image having both thin broken line image artifacts and jaggy without edge transition artifacts. Such degraded images having both types of aliasing artifacts can be useful during training of a machine learning model to teach the machine learning model how to recognize multiple types of aliasing artifacts in a single image. Although FIGS. 11A through 12C illustrate examples of input images, degraded artifact images, and corresponding detection maps, various changes may be made to FIGS. 11A through 12C. For example, although the images 1101 through 1103 and 1201 through 1203 are of particular scenes or environments and/or of objects in the particular scenes or environments, various other scenes or environments and objects therein could be the subject of the images.

Figure 13A:
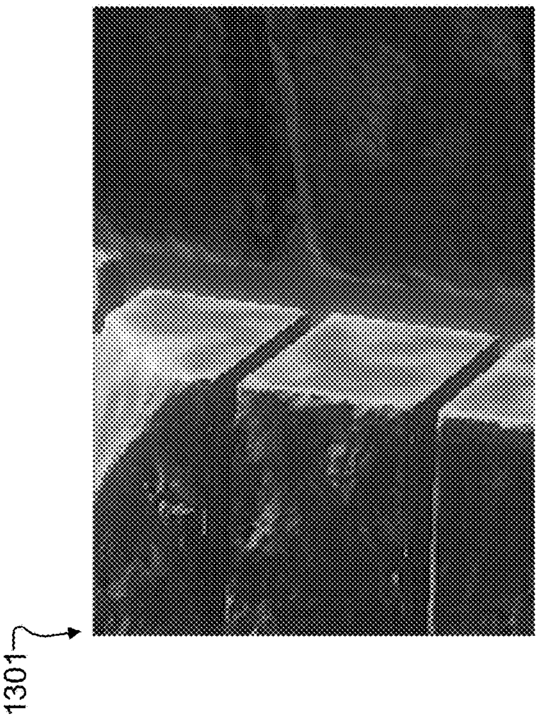
FIGS. 13A through 14B illustrate example input images and associated results obtained using a trained image enhancement network in accordance with this disclosure.
Figure 13B:
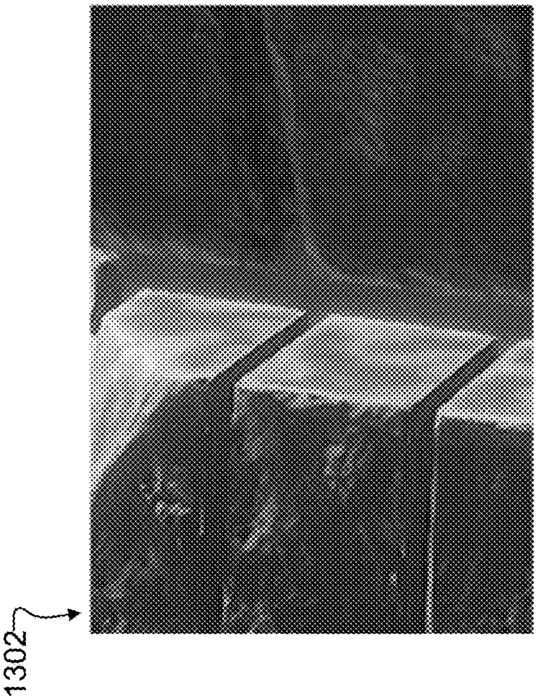
Figure 14A:
Figure 14B:
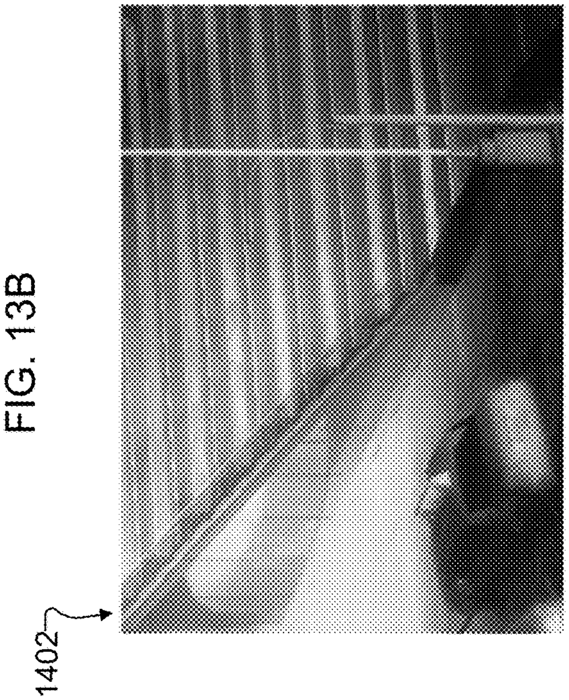

After generating the pairs of high-quality images and the simulated degraded images, the image enhancement network can be trained as described in FIG. 3 to learn the inverse process to remove 3D rendering aliasing artifacts on real graphic images. For example, FIGS. 13A through 14B illustrate example input images and associated results obtained using the trained image enhancement network in accordance with this disclosure. In the examples of FIGS. 13A through 14B, it can be seen that the trained image enhancement network learns the inverse process of the artifact simulation used during training to effectively reduce or remove aliasing artifacts of degraded input images. For example, FIG. 13A shows a degraded input image 1301. The image enhancement network receives as input the image 1301 and outputs an enhanced image 1302 as shown in FIG. 13B, where aliasing artifacts such as broken lines or jaggy artifacts are removed, producing an overall smoother texture to the image 1302. FIG. 14A shows another degraded input image 1401. The image enhancement network receives as input the image 1401 and outputs an enhanced image 1402 as shown in FIG. 14B, where aliasing artifacts such as broken lines or jaggy artifacts are removed, producing an overall smoother texture to the image 1402.

Although FIGS. 13A through 14B illustrate examples of input images and associated results obtained using the trained image enhancement network, various changes may be made to FIGS. 13A through 14B. For example, although the images 1301 through 1402 are of particular scenes or environments and/or of objects in the particular scenes or environments, various other scenes or environments and objects therein could be the subject of the images.

Figure 15:
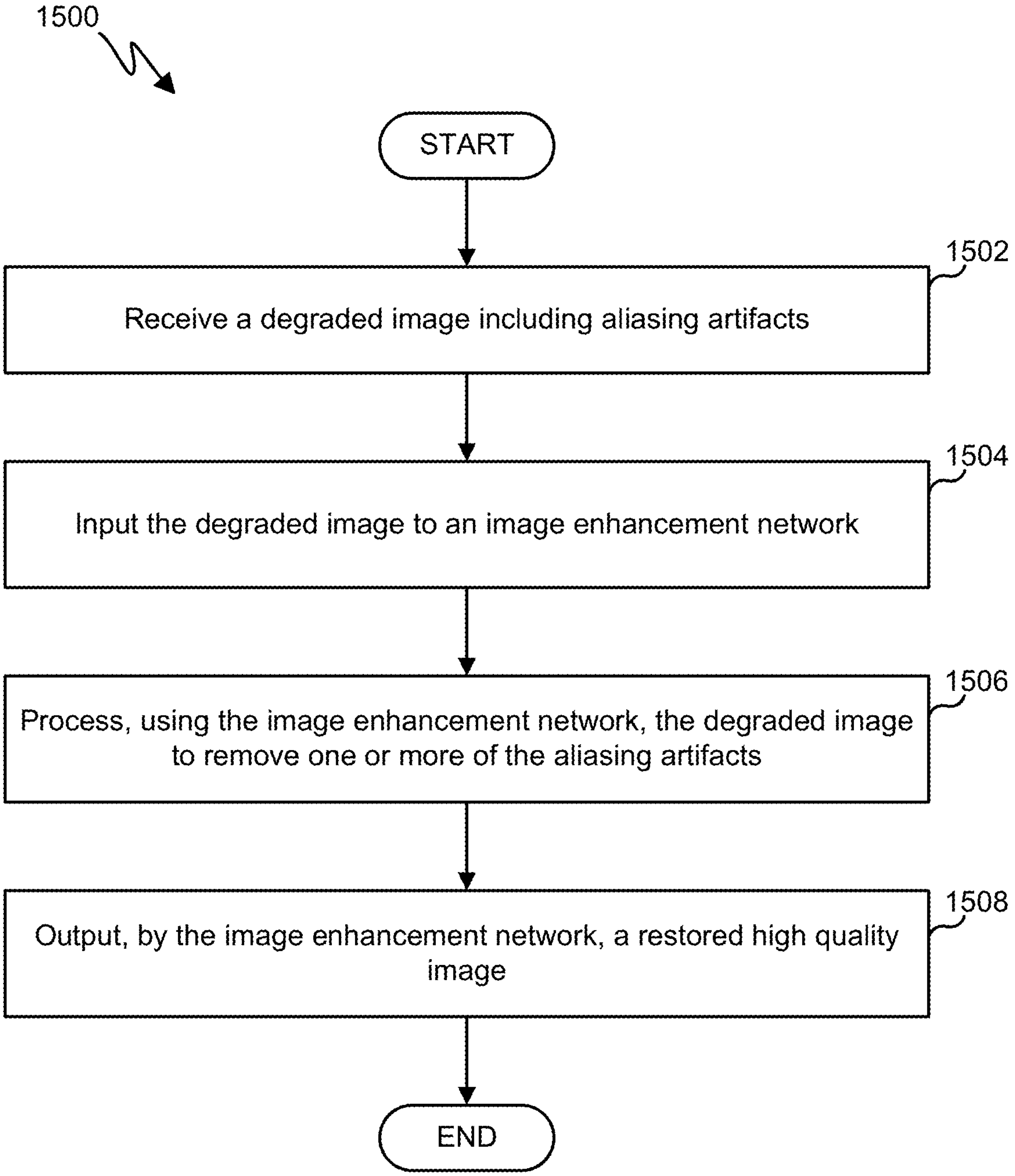
FIG. 15 illustrates an example method for controlling aliasing artifacts using artificial intelligence in accordance with this disclosure.

FIG. 15 illustrates an example method 1500 for controlling aliasing artifacts using artificial intelligence in accordance with this disclosure. For ease of explanation, the method 1500 shown in FIG. 15 is described as being performed by the electronic device 101 in the network configuration 100 of FIG. 1, where the electronic device 101 can implement the architecture 300 shown in FIG. 3. However, the method 1500 shown in FIG. 15 could be performed by any other suitable device(s) and in any other suitable system(s), such as when the method 1500 is performed using the server 106, and the method 1500 could involve the use of any other suitable architecture.

As shown in FIG. 15, a degraded image including aliasing artifacts is received at step 1502. This may include, for example, the processor 120 of the electronic device 101 obtaining the degraded image (such as a degraded image 302 having various aliasing artifacts) from any suitable source, such as a video stream. At step 1504, the degraded image is input to an image enhancement network (such as trained image enhancement network 308). At step 1506, the degraded image is processed using the image enhancement network to remove one or more of the aliasing artifacts. This may include, for example, the processor 120 of the electronic device 101 executing the image enhancement network that is trained to recognize, remove, and replace aliasing artifacts such as broken line objects, jaggy artifacts without edge transitions, and/or general jaggy artifacts in input images. At step 1508, a restored high-quality image is output by the image enhancement network. This may include, for example, the processor 120 of the electronic device 101 causing the output image to be displayed on a display screen, such as during a video stream.

Although FIG. 15 illustrates one example of a method 1500 for controlling aliasing artifacts using artificial intelligence, various changes may be made to FIG. 15. For example, while shown as a series of steps, various steps in FIG. 15 may overlap, occur in parallel, occur in a different order, or occur any number of times.

Figure 16:
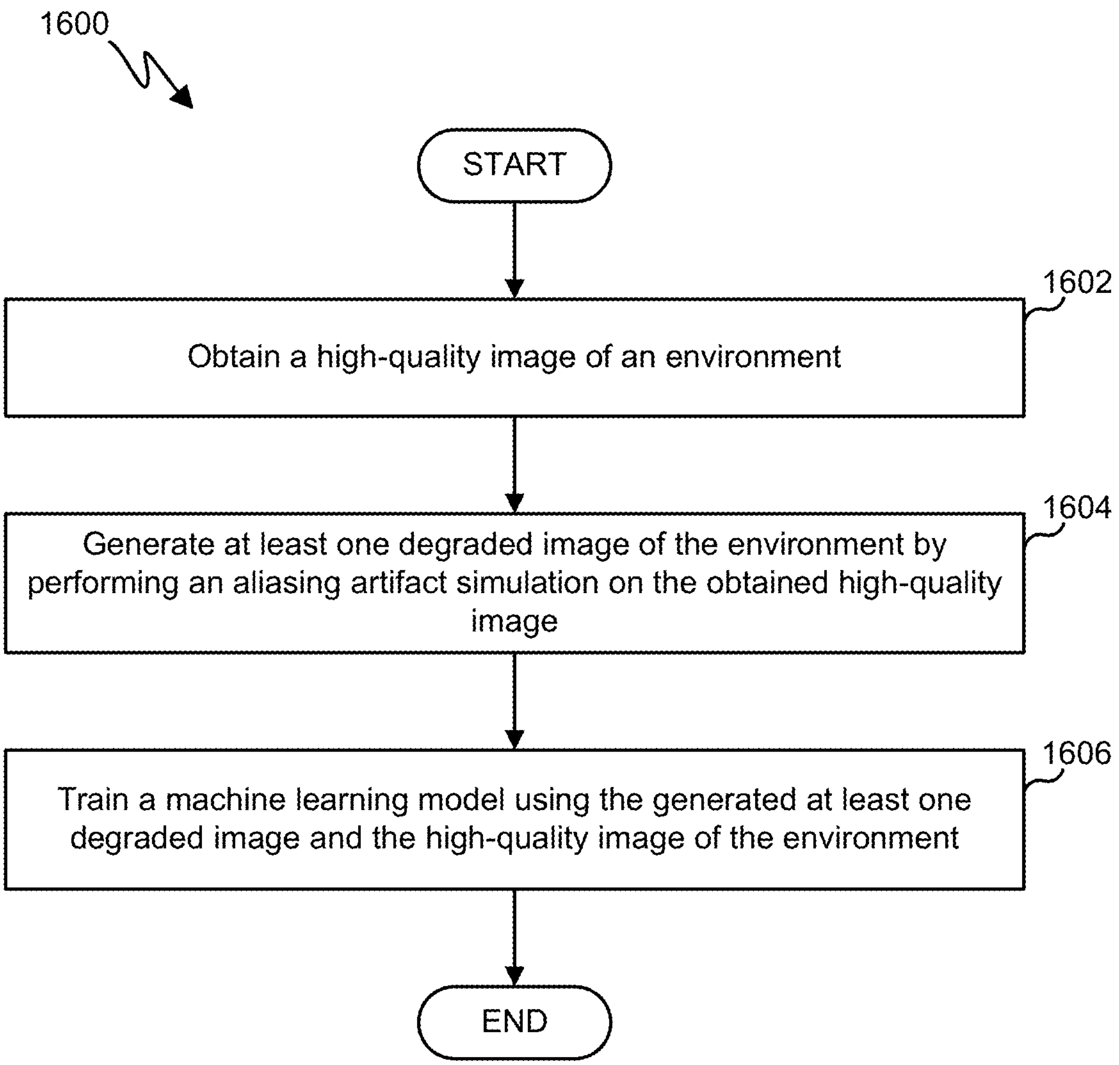
FIG. 16 illustrates an example method for training a machine learning model in accordance with this disclosure.

FIG. 16 illustrates an example method 1600 for training a machine learning model in accordance with this disclosure. For ease of explanation, the method 1600 shown in FIG. 16 is described as being performed by the electronic device 101 in the network configuration 100 of FIG. 1, where the electronic device 101 can implement the architecture 200 shown in FIG. 2. However, the method 1600 shown in FIG. 16 could be performed by any other suitable device(s) and in any other suitable system(s), such as when the method 1600 is performed using the server 106, and the method 1600 could involve the use of any other suitable architecture.

As shown in FIG. 16, a high-quality image (such as a high-resolution image) is obtained at step 1602. This may include, for example, the processor 120 of the electronic device 101 obtaining the high-quality image (such as a high-quality image 202 having little to no aliasing artifacts) from any suitable source, such as from a training image set. At step 1604, at least one degraded image degraded image of the environment is generated by performing an aliasing artifact simulation on the obtained high-quality image. This may include, for example, the processor 120 of the electronic device 101 performing the artifact simulation operation 210 in order to introduce one or more aliasing artifacts into the high-quality image.

At step 1606, the machine learning model is trained using the generated at least one degraded image and the high-quality image of the environment. For example, this may include the processor 120 using the high-quality image and the degraded image as a pair during training of the machine learning model to teach the model how, given a degraded image, to enhance the image in order to obtain a high-quality image. That is, the high-quality image in the image pair acts as a ground truth with respect to the type of output image to be achieved, and the degraded image acts as an example input as to the types of degraded or artifact images the machine learning model will encounter during inferencing.

Since the simulated degraded image can be generated from the high-quality image, this avoids a need to store all the pairs of high-quality images and degraded images for training its network for image enhancement. Instead, only the high-quality images need to be stored, while the corresponding degraded images can be generated for temporary use during training from the high-quality images (although this need not be the case). Also, as described in this disclosure, the degree of artifacts introduced during the method 1600 can be controlled, which can make training more efficient and robust. The method 1600 can be used with any desired artifact simulation technique(s). Additionally, the method 1600 can be performed any number of times to create any number of pairs of high-quality images and degraded images for use during training.

Training of the machine learning model can involve updating parameters of the model until an acceptable accuracy level is reached. For example, when a loss calculated using a loss function is larger than desired, the parameters of the model can be adjusted. Once adjusted, training can continue by providing the same or additional training data to the adjusted model, and additional outputs from the model (restored high-quality images) can be compared to the ground truths (input high-quality images from the training set) so that additional losses can be determined using the loss function. Eventually, the model produces more accurate outputs that more closely match the ground truths, and the measured loss becomes less. At some point, the measured loss can drop below a specified threshold, and the initial training of the model can be completed.

Although FIG. 16 illustrates one example of a method 1600 for training a machine learning model, various changes may be made to FIG. 16. For example, while shown as a series of steps, various steps in FIG. 16 may overlap, occur in parallel, occur in a different order, or occur any number of times.

Figure 17:
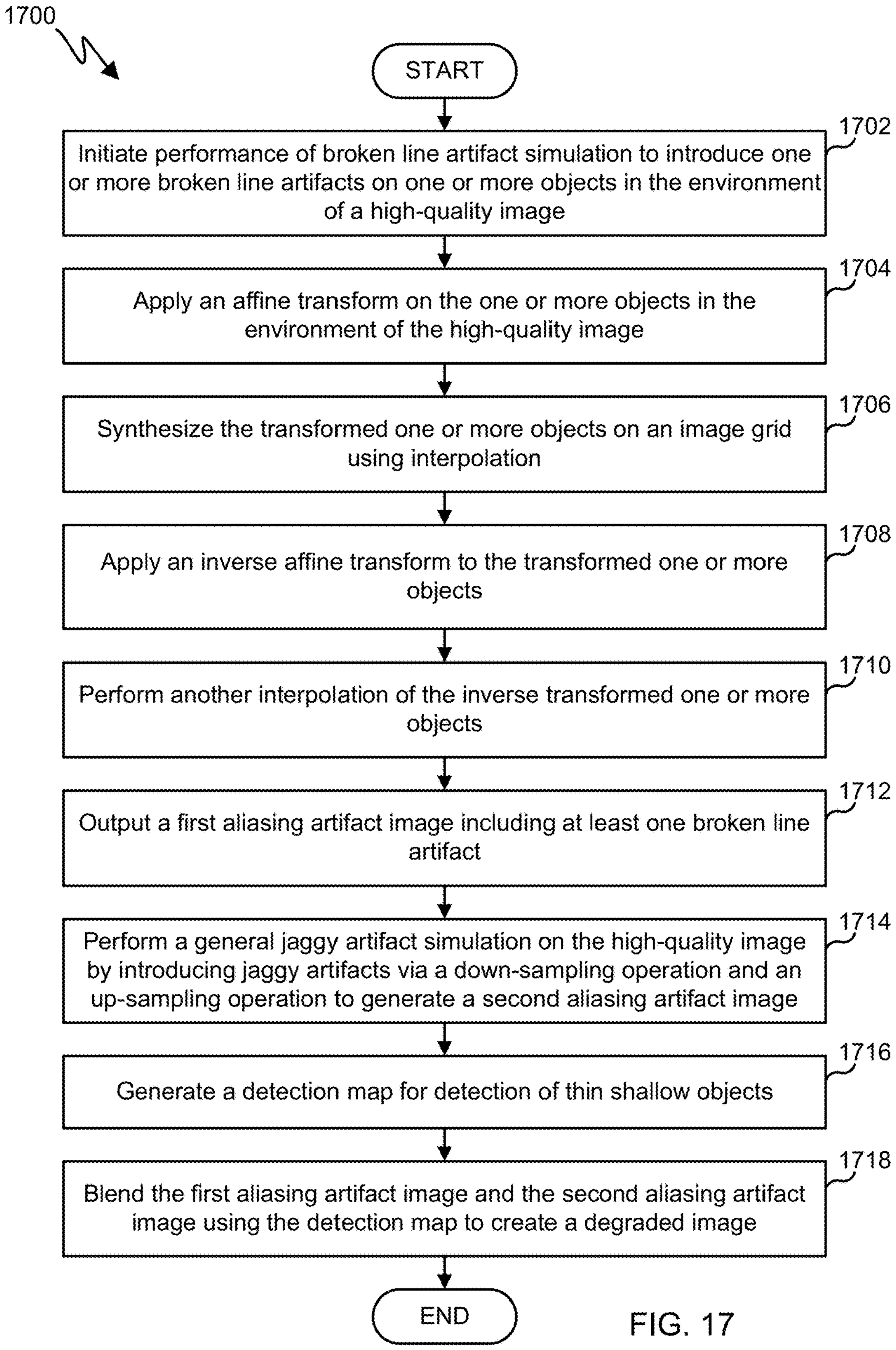
FIG. 17 illustrates an example method for performing a broken line artifact simulation in accordance with this disclosure.

FIG. 17 illustrates an example method 1700 for performing a broken line artifact simulation in accordance with this disclosure. For ease of explanation, the method 1700 shown in FIG. 17 is described as being performed by the electronic device 101 in the network configuration 100 of FIG. 1, where the electronic device 101 can implement the architecture 600 shown in FIG. 6. However, the method 1700 shown in FIG. 17 could be performed by any other suitable device(s) and in any other suitable system(s), such as when the method 1700 is performed using the server 106, and the method 1700 could involve the use of any other suitable architecture.

As shown in FIG. 17, at step 1702, performance of a broken line artifact simulation is initiated to introduce one or more broken line artifacts on one or more objects in the environment of a high-quality image. This may include, for example, the processor 120 of the electronic device 101 obtaining the high-quality image (such as a high-quality image 602 having little to no aliasing artifacts) from any suitable source, such as from a training image set. At step 1704, an affine transform (such as 2D rotation) is applied on the one or more objects in the environment of the high-quality image. At step 1706, the transformed one or more objects are synthesized on an image grid using interpolation (such as using nearest neighbor). At step 1708, an inverse affine transform is applied to the transformed one or more objects. At step 1710, another interpolation (such as bicubic interpolation) of the inverse transformed one or more objects is performed. At step 1712, a first aliasing artifact image including at least one broken line artifact is output. Steps 1704-1712 may include, for example, the processor 120 of the electronic device 101 performing the broken line artifact generation operation 604 as described with respect to FIG. 6.

At step 1714, a general jaggy artifact simulation is performed on the high-quality image by introducing jaggy artifacts via a down-sampling operation and an up-sampling operation to generate a second aliasing artifact image. This may include, for example, the processor 120 of the electronic device 101 performing the jaggy artifact generation operation 606 as described with respect to FIG. 6. At step 1716, a detection map for detection of thin shallow objects is generated. This may include, for example, the processor 120 of the electronic device 101 performing the thin shallow object with smooth background detection operation 608 as described with respect to FIG. 6. At step 1718, the first aliasing artifact image and the second aliasing artifact image are blended using the detection map to create a final degraded image to be used during training of a machine learning model. This may include, for example, the processor 120 of the electronic device 101 performing the blending operation 610 as described with respect to FIG. 6. Using the detection map during the blending of the first aliasing artifact image and the second aliasing artifact image can assist with determining placement of the at least one broken line artifact in the degraded image.

Although FIG. 17 illustrates one example of a method 1700 for performing a broken line artifact simulation, various changes may be made to FIG. 17. For example, while shown as a series of steps, various steps in FIG. 17 may overlap, occur in parallel, occur in a different order, or occur any number of times. Additionally, further blending operations could be performed. For instance, if one or more other degraded images having aliasing artifacts are created (such as jaggy artifacts without edge transitions), the degraded image created by the method 1700 can be blended with the one or more other degraded images.

Figure 18:
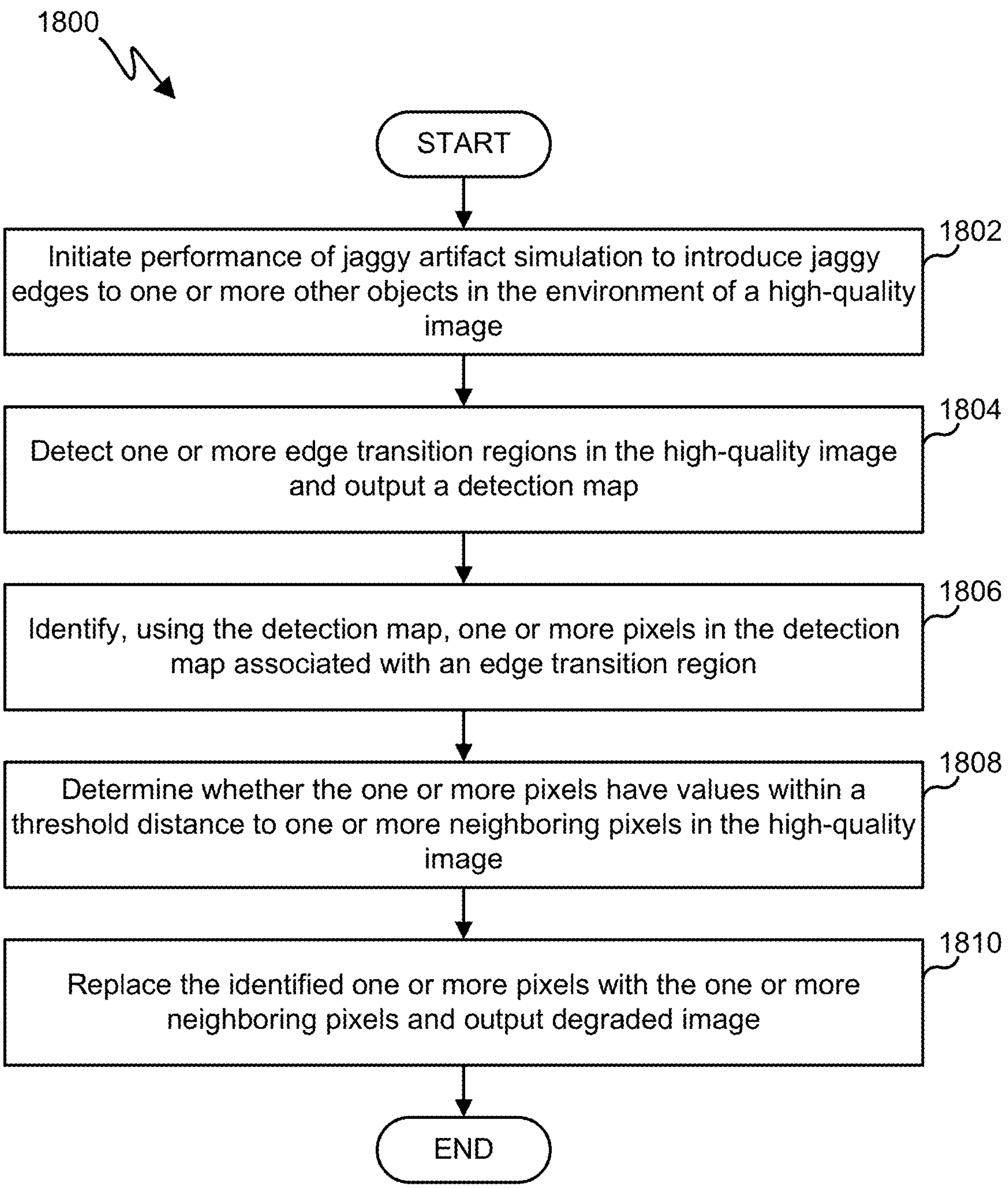
FIG. 18 illustrates an example method for performing a jaggy artifact simulation in accordance with this disclosure.

FIG. 18 illustrates an example method 1800 for performing a jaggy artifact simulation in accordance with this disclosure. For ease of explanation, the method 1800 shown in FIG. 18 is described as being performed by the electronic device 101 in the network configuration 100 of FIG. 1, where the electronic device 101 can implement the architecture 1000 shown in FIG. 10. However, the method 1800 shown in FIG. 18 could be performed by any other suitable device(s) and in any other suitable system(s), such as when the method 1800 is performed using the server 106, and the method 1800 could involve the use of any other suitable architecture.

As shown in FIG. 18, at step 1802, performance of a jaggy artifact simulation is initiated to introduce jaggy edges to one or more other objects in the environment of a high-quality image. This may include, for example, the processor 120 of the electronic device 101 obtaining the high-quality image (such as a high-quality image 1002 having little to no aliasing artifacts) from any suitable source, such as from a training image set. At step 1804, one or more edge transition regions in the high-quality image are detected and a detection map is output. This may include, for example, the processor 120 of the electronic device 101 performing the edge transition region detection operation 1004 described with respect to FIG. 10.

At step 1806, one or more pixels in the detection map associated with an edge transition region are identified using the detection map. At step 1808, it is determined whether the one or more pixels have values within a threshold distance to one or more neighboring pixels in the high-quality image. Locating the one or more neighboring pixels can be performed using a window, such as a 5×5 window, on the high-quality image. At step 1810, the identified one or more pixels are replaced with the one or more neighboring pixels and a final degraded image is output. Steps 1806-1810 may include, for example, the processor 120 of the electronic device 101 performing the jaggy artifact without transition generation operation 1006 as described with respect to FIG. 10.

Although FIG. 18 illustrates one example of a method 1800 for performing a jaggy artifact simulation, various changes may be made to FIG. 18. For example, while shown as a series of steps, various steps in FIG. 18 may overlap, occur in parallel, occur in a different order, or occur any number of times. Additionally, further blending operations could be performed. For instance, if one or more other degraded images having aliasing artifacts are created (such as broken thin line artifacts), the degraded image created by the method 1800 can be blended with the one or more other degraded images.

It should be noted that the functions shown in or described with respect to FIGS. 2 through 18 can be implemented in an electronic device 101, server 106, or other device(s) in any suitable manner. For example, in some embodiments, at least some of the functions shown in or described with respect to FIGS. 2 through 18 can be implemented or supported using one or more software applications or other software instructions that are executed by the processor 120 of the electronic device 101, server 106, or other device(s). In other embodiments, at least some of the functions shown in or described with respect to FIGS. 2 through 18 can be implemented or supported using dedicated hardware components. In general, the functions shown in or described with respect to FIGS. 2 through 18 can be performed using any suitable hardware or any suitable combination of hardware and software/firmware instructions. Also, the functions shown in or described with respect to FIGS. 2 through 18 can be performed by a single device or by multiple devices.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

receiving a degraded image comprising aliasing artifacts;

inputting the degraded image to an image enhancement network, wherein the image enhancement network is trained by:

obtaining a high-quality image of an environment; and performing an aliasing artifact simulation on the obtained high-quality image comprising at least one of:

performing a broken line artifact simulation using affine transform and interpolation to introduce one or more broken line artifacts on one or more objects in the environment of the high-quality image; and performing a jaggy artifact simulation using a detection map to introduce jaggy edges to one or more other objects in the environment of the high-quality image;

processing, using the image enhancement network, the degraded image to remove one or more of the aliasing artifacts; and outputting, by the image enhancement network, a restored high-quality image.

2. The method of claim 1, wherein the image enhancement network is further trained by:

generating at least one degraded image of the environment by performing the aliasing artifact simulation on the obtained high-quality image.

3. The method of claim 2, wherein performing the broken line artifact simulation comprises:

applying the affine transform on the one or more objects in the environment of the high-quality image;

synthesizing the transformed one or more objects on an image grid using the interpolation;

applying an inverse affine transform to the transformed one or more objects;

performing another interpolation of the inverse transformed one or more objects; and outputting a first aliasing artifact image comprising at least one broken line artifact.

4. The method of claim 3, wherein performing the broken line artifact simulation further comprises:

performing a general jaggy artifact simulation on the high-quality image by introducing jaggy artifacts via a down-sampling operation and an up-sampling operation to generate a second aliasing artifact image; and blending the first aliasing artifact image and the second aliasing artifact image.

5. The method of claim 4, wherein performing the broken line artifact simulation further comprises:

generating a detection map for detection of thin shallow objects; and during the blending of the first aliasing artifact image and the second aliasing artifact image, using the detection map to determine placement of the at least one broken line artifact in the degraded image.

6. The method of claim 2, wherein performing the jaggy artifact simulation comprises:

detecting one or more edge transition regions in the high-quality image and outputting the detection map;

identifying, using the detection map, one or more pixels in the detection map associated with an edge transition region;

determining whether the one or more pixels have values within a threshold distance to one or more neighboring pixels in the high-quality image; and replacing the identified one or more pixels with the one or more neighboring pixels.

7. The method of claim 6, further comprising:

locating the one or more neighboring pixels in a 5×5 window of the high-quality image.

8. An electronic device comprising:

at least one processing device configured to:

receive a degraded image comprising aliasing artifacts;

input the degraded image to an image enhancement network, wherein to train the image enhancement network:

a high-quality image of an environment is obtained; and an aliasing artifact simulation is performed on the obtained high-quality image comprising at least one of:

a broken line artifact simulation using affine transform and interpolation to introduce one or more broken line artifacts on one or more objects in the environment of the high-quality image; and a jaggy artifact simulation using a detection map to introduce jaggy edges to one or more other objects in the environment of the high-quality image;

process, using the image enhancement network, the degraded image to remove one or more of the aliasing artifacts; and output, by the image enhancement network, a restored high-quality image.

9. The electronic device of claim 8, wherein performance of the aliasing artifact simulation on the obtained high-quality image generates at least one degraded image of the environment.

10. The electronic device of claim 9, wherein to perform the broken line artifact simulation:

the affine transform is applied on the one or more objects in the environment of the high-quality image;

the transformed one or more objects are synthesized on an image grid using the interpolation;

an inverse affine transform is applied to the transformed one or more objects;

another interpolation of the inverse transformed one or more objects is performed; and a first aliasing artifact image is output comprising at least one broken line artifact.

11. The electronic device of claim 10, wherein to perform the broken line artifact simulation:

a general jaggy artifact simulation is performed on the high-quality image by introducing jaggy artifacts via a down-sampling operation and an up-sampling operation to generate a second aliasing artifact image; and the first aliasing artifact image and the second aliasing artifact image are blended.

12. The electronic device of claim 11, wherein to perform the broken line artifact simulation:

a detection map is generated for detection of thin shallow objects; and during the blending of the first aliasing artifact image and the second aliasing artifact image, the detection map is used to determine placement of the at least one broken line artifact in the degraded image.

13. The electronic device of claim 9, wherein to perform the jaggy artifact simulation:

one or more edge transition regions are detected in the high-quality image and the detection map is output;

using the detection map, one or more pixels associated with an edge transition region are identified in the detection map;

a determination is performed regarding whether the one or more pixels have values within a threshold distance to one or more neighboring pixels in the high-quality image; and the identified one or more pixels are replaced with the one or more neighboring pixels.

14. The electronic device of claim 13, wherein the one or more neighboring pixels are located in a 5×5 window of the high-quality image.

15. A non-transitory machine readable medium containing instructions that when executed cause at least one processor of an electronic device to:

receive a degraded image comprising aliasing artifacts;

input the degraded image to an image enhancement network, wherein to train the image enhancement network:

a high-quality image of an environment is obtained; and an aliasing artifact simulation is performed on the obtained high-quality image comprising at least one of:

a broken line artifact simulation using affine transform and interpolation to introduce one or more broken line artifacts on one or more objects in the environment of the high-quality image; and a jaggy artifact simulation using a detection map to introduce jaggy edges to one or more other objects in the environment of the high-quality image;

process, using the image enhancement network, the degraded image to remove one or more of the aliasing artifacts; and output, by the image enhancement network, a restored high-quality image.

16. The non-transitory machine readable medium of claim 15, wherein performance of the aliasing artifact simulation on the obtained high-quality image generates at least one degraded image of the environment.

17. The non-transitory machine readable medium of claim 16, wherein to perform the broken line artifact simulation:

the affine transform is applied on the one or more objects in the environment of the high-quality image;

the transformed one or more objects are synthesized on an image grid using the interpolation;

an inverse affine transform is applied to the transformed one or more objects;

another interpolation of the inverse transformed one or more objects is performed; and a first aliasing artifact image is output comprising at least one broken line artifact.

18. The non-transitory machine readable medium of claim 17, wherein to perform the broken line artifact simulation:

a general jaggy artifact simulation is performed on the high-quality image by introducing jaggy artifacts via a down-sampling operation and an up-sampling operation to generate a second aliasing artifact image; and the first aliasing artifact image and the second aliasing artifact image are blended.

19. The non-transitory machine readable medium of claim 18, wherein to perform the broken line artifact simulation:

a detection map is generated for detection of thin shallow objects; and during the blending of the first aliasing artifact image and the second aliasing artifact image, the detection map is used to determine placement of the at least one broken line artifact in the degraded image.

20. The non-transitory machine readable medium of claim 16, wherein to perform the jaggy artifact simulation:

one or more edge transition regions are detected in the high-quality image and a detection map is output;

using the detection map, one or more pixels associated with an edge transition region are identified in the detection map;

a determination is performed regarding whether the one or more pixels have values within a threshold distance to one or more neighboring pixels in the high-quality image; and the identified one or more pixels are replaced with the one or more neighboring pixels.

* * * * *